United States Patent
Inada et al.

(10) Patent No.: US 10,244,238 B2
(45) Date of Patent: Mar. 26, 2019

(54) MOVING PICTURE COMPRESSION APPARATUS, IMAGE PROCESSING APPARATUS, MOVING PICTURE COMPRESSION METHOD, IMAGE PROCESSING METHOD, AND DATA STRUCTURE OF MOVING PICTURE COMPRESSION FILE

(71) Applicant: Sony Computer Entertainment Inc., Tokyo (JP)

(72) Inventors: Tetsugo Inada, Kanagawa (JP); Akio Ohba, Kanagawa (JP); Hiroyuki Segawa, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 436 days.

(21) Appl. No.: 14/426,658

(22) PCT Filed: Jul. 22, 2013

(86) PCT No.: PCT/JP2013/004433
§ 371 (c)(1),
(2) Date: Mar. 6, 2015

(87) PCT Pub. No.: WO2014/045504
PCT Pub. Date: Mar. 27, 2014

(65) Prior Publication Data
US 2015/0229927 A1    Aug. 13, 2015

(30) Foreign Application Priority Data
Sep. 20, 2012    (JP) .................................. 2012-207515

(51) Int. Cl.
*H04N 7/12*         (2006.01)
*H04N 19/136*       (2014.01)
(Continued)

(52) U.S. Cl.
CPC ........... *H04N 19/136* (2014.11); *G06T 5/001* (2013.01); *G06T 17/10* (2013.01); *H04N 19/119* (2014.11);
(Continued)

(58) Field of Classification Search
CPC .. H04N 19/119; H04N 19/136; H04N 19/137; H04N 19/167; H04N 19/176
See application file for complete search history.

(56) References Cited

U.S. PATENT DOCUMENTS

| | | | |
|---|---|---|---|
| 6,215,507 B1 * | 4/2001 | Nally | G09G 5/39 345/540 |
| 6,563,999 B1 | 5/2003 | Suzuoki | |

(Continued)

FOREIGN PATENT DOCUMENTS

| | | |
|---|---|---|
| CN | 1592420 A | 3/2005 |
| JP | 11146397 A | 5/1999 |
| JP | 2012060612 A | 3/2012 |

OTHER PUBLICATIONS

Sullivan et al, 2012. U.S. Appl. No. 61/667,381. (Year: 2012).*
(Continued)

*Primary Examiner* — Farzana Hossain
(74) *Attorney, Agent, or Firm* — Matthew B. Dernier, Esq.

(57) ABSTRACT

A tile image sequence obtained by dividing a frame into a predetermined size is further divided into another predetermined size on an image plane to generate a voxel (for example, a voxel. If a redundancy in a space direction or a time direction exists, then data is reduced in the direction, and sequences in the time direction are deployed on a two-dimensional plane. Voxel images are placed on an image plane of a predetermined size to generate one integrated image. In a grouping pattern which exhibits a minimum quantization error, pixels are collectively placed in the
(Continued)

region of each voxel image for each group (integrated image). The integrated image after the re-placement is compressed in accordance with a predetermined compression method to generate a compressed image and reference information for determining the position of a needed pixel.

15 Claims, 17 Drawing Sheets

(51) Int. Cl.
  *H04N 19/503* (2014.01)
  *H04N 19/176* (2014.01)
  *H04N 19/119* (2014.01)
  *H04N 19/46* (2014.01)
  *H04N 19/90* (2014.01)
  *H04N 19/59* (2014.01)
  *H04N 19/137* (2014.01)
  *H04N 19/167* (2014.01)
  *H04N 19/44* (2014.01)
  *G06T 5/00* (2006.01)
  *G06T 17/10* (2006.01)

(52) U.S. Cl.
  CPC ......... *H04N 19/137* (2014.11); *H04N 19/167* (2014.11); *H04N 19/176* (2014.11); *H04N 19/44* (2014.11); *H04N 19/46* (2014.11); *H04N 19/503* (2014.11); *H04N 19/59* (2014.11); *H04N 19/90* (2014.11)

(56) References Cited

U.S. PATENT DOCUMENTS

| | | | | |
|---|---|---|---|---|
| 2001/0022815 | A1* | 9/2001 | Agarwal | H04N 19/119 375/240.16 |
| 2006/0067583 | A1* | 3/2006 | Mushano | H04N 19/30 382/239 |
| 2008/0159639 | A1* | 7/2008 | Dvir | H04N 19/176 382/236 |
| 2009/0208050 | A1* | 8/2009 | Shimodaira | G06T 5/005 382/100 |
| 2014/0003498 | A1* | 1/2014 | Sullivan | H04N 19/70 375/240.03 |

OTHER PUBLICATIONS

International Search Report for corresponding PCT Application No. PCT/JP2013/004433, dated Oct. 15, 2013.
Office Action for corresponding CN Application No. 201380047764X, 9 pages, dated Jun. 2, 2017.
International Preliminary Report on Patentability and Written Opinion for corresponding PCT Application No. PCT/JP2013/004433, 8 pages, dated Apr. 2, 2015.

* cited by examiner

MOVING PICTURE COMPRESSION APPARATUS, IMAGE PROCESSING APPARATUS, MOVING PICTURE COMPRESSION METHOD, IMAGE PROCESSING METHOD, AND DATA STRUCTURE OF MOVING PICTURE COMPRESSION FILE

TECHNICAL FIELD

The present invention relates to an image processing technology for displaying an image including a moving picture.

BACKGROUND ART

An entertainment system for home use which not only executes a game program but also can reproduce a moving picture has been proposed. In the entertainment system for home use, a GPU generates a three-dimensional image using a polygon (refer to, for example, PTL 1). It typically is a significant issue how efficiently an image is displayed irrespective of whether the image is a moving picture or a still image. Therefore, various technologies have been developed and placed into practical use in various fields such as a compression technology, a transmission technology, an image processing technology, and a displaying technology of image data, and it has become possible for high definition images to be enjoyed familiarly in a variety of situations.

CITATION LIST

Patent Literature

[PTL 1] U.S. Pat. No. 6,563,999 A

SUMMARY

Technical Problem

A request to display a high-definition image in a high responsibility to a variation or the like of the angle of view by a viewpoint movement by a user or a progress of a game typically exists. For example, in order to implement image display, which has a degree of freedom with respect to the point of view such as to display a region to which a user desires to pay attention from within an overall displayed image in an enlarged scale or to move to display a different region, in a high responsibility, also it is necessary to make random access to image data of a large size possible while the image data of a large size are processed in a short time.

Specifically, in the case of a moving picture in which a large number of frames are displayed successively with respect to lapse of time, since the data size increases, generally the compression rate is prioritized. However, as the compression rate rises, the arithmetic operation cost upon decoding increases and the granularity of data access is inclined to increase. As a result, even when it is desired to display only a restricted region, it may become necessary to decode an overall area of a frame or deploy the overall area in a memory. This is disadvantageous in the arithmetic operation cost and the memory cost.

The present invention has been made in view of such a problem as described above, and the object of the present invention resides in provision of an image processing technology which can display a moving picture in a high responsibility satisfying various requests.

Solution to Problem

A certain mode of the present invention relates to a moving picture compression apparatus. This moving picture compression apparatus includes a tile image sequence generation section configured to divide a frame sequence, which configures moving picture data, in a space direction which configures an image plane to generate a tile image sequence, an image compression section configured to divide the tile image sequence in the space direction and a time direction to form a plurality of voxels of a predetermined size, deploy image sequences in the time direction included in each one voxel on a two-dimensional plane to form a voxel image, connect the voxel images to form an integrated image and compress the integrated image, and a compressed data generation section configured to output the compressed integrated image in an associated relationship with a position on a moving picture frame and a position on a frame sequence of the original tile images.

Another mode of the present invention relates to a data image processing apparatus. This image processing apparatus includes an information processing section configured to calculate a frame to be displayed in a frame sequence, which configures moving picture data, and a region to be displayed in the frame, a compressed data reading-in section configured to read in, for each of voxels of a predetermined size obtained by dividing the frame sequence in a space direction and a time direction, compressed data of an integrated image configured from voxel images obtained by deploying an image sequence in the time direction on a two-dimensional plane, a decoding portion configured to read out data of a voxel image suitable for display from the compressed data based on information calculated by the information processing section and decode the read out data, and a rendering portion configured to re-construct the decoded data in the time and space directions to render a display image.

A further mode of the present invention relates to a moving picture compression method. This moving picture compression method is a moving picture compression method by a moving picture compression apparatus compressing moving picture data and includes a step of reading out a frame sequence which configures moving picture data stored in a storage apparatus and dividing the frame sequence in a space direction which configures an image plane to generate a tile image sequence, a step of dividing the tile image sequence in the space direction and a time direction to form a plurality of voxels of a predetermined size, a step of deploying image sequences in the time direction included in each one voxel on a two-dimensional plane to form a voxel image and connecting the voxel images to form an integrated image, a step of compressing the integrated image, and a step of outputting the compressed integrated image in an associated relationship with a position on a moving picture frame and a position on a frame sequence of the original tile images to the storage apparatus.

A still further mode of the present invention relates to an image processing method. This image processing method is an image processing method by an image processing apparatus generating a display image using compressed data of a moving picture, and includes a step of calculating a frame to be displayed in a frame sequence, which configures moving picture data, and a region to be displayed in the frame, a step of reading out, from a memory in which, for each of voxels of a predetermined size obtained by dividing the frame sequence in a space direction and a time direction, compressed data of an integrated image configured from voxel images obtained by deploying an image sequence in the time direction on a two-dimensional plane are stored, data of a voxel image suitable for display based on the calculated information and decoding the readout data, and a step of re-constructing the decoded data in the time and space directions to render a display image and outputting the display image to a display apparatus.

A yet further mode of the present invention relates to a data structure of a moving picture compression file. This data structure is a data structure of a moving picture compression file which associates, for each of voxels of a predetermined size obtained by dividing a frame sequence of a moving picture in a space direction and a time direction, compressed data of an integrated image configured from voxel images obtained by deploying an image sequence in the time direction on a two-dimensional plane and reference information which associates a position in each frame and a position of a voxel image corresponding to the integrated image with each other, wherein a position of a voxel image suitable for display is specified by an image processing apparatus, which uses the moving picture compression file to display the moving picture, by referring to the reference information based on a frame to be displayed in the frame sequence and a region to be displayed in the frame, and based on the specified position, data of the voxel image is read out from a memory such that the image of the region to be displayed is successively rendered.

It is to be noted that also arbitrary combinations of the components described above and representations of the present invention obtained by conversion between different ones of a method, an apparatus, a system, a computer program and so forth are effective as modes of the present invention.

Advantageous Effect of Invention

According to the present invention, three-dimensional data which can be randomly accessed and exhibit a high through-put can be outputted.

DESCRIPTION OF EMBODIMENTS

Figure 1:
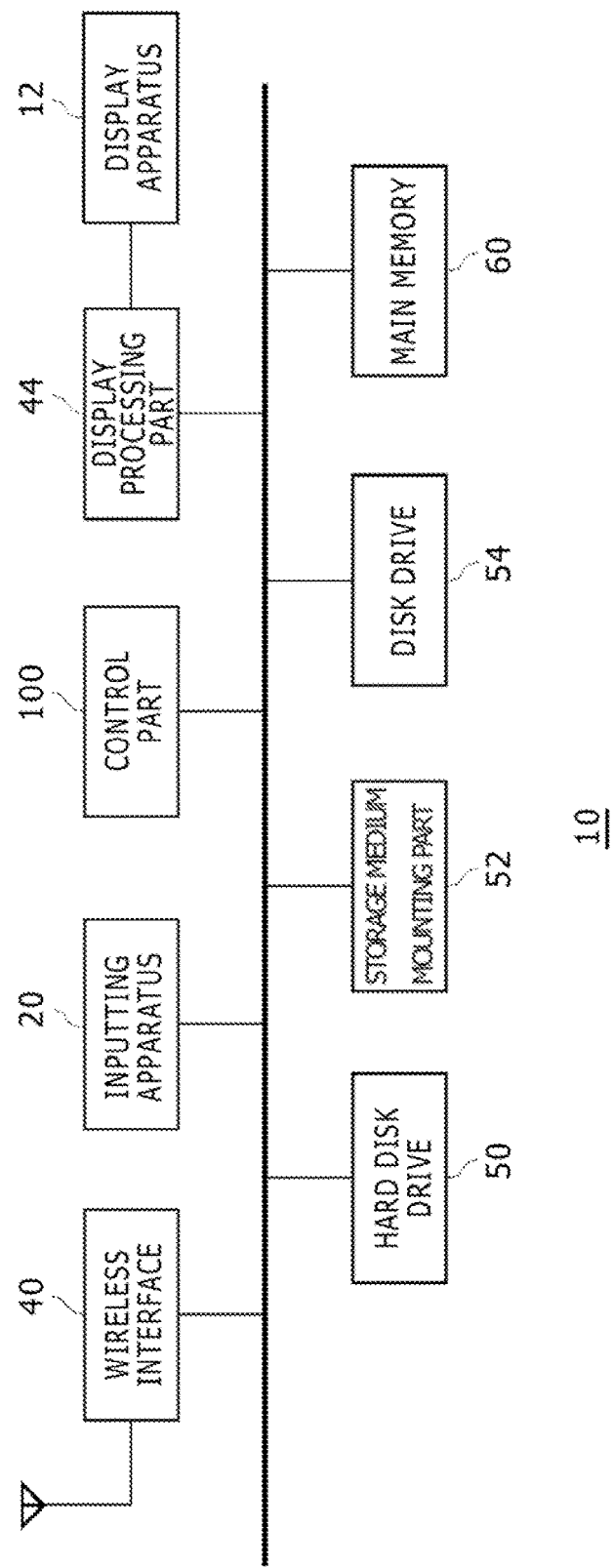
FIG. 1 is a view depicting a configuration of an image processing apparatus according to an embodiment.

In the present embodiment, a moving picture is displayed for random access thereto on an image plane and with respect to a time axis without increasing the arithmetic operation cost and the memory cost. A moving picture taken as a display target here may be a movie, an animation, or a moving picture or the like picked up by a user, which themselves make principal contents, or may be a moving picture represented as a member of an image such as a video texture which is mapped in computer graphics of a game or the like.

In the case of a still image, as a compression method, JPEG (Joint Photographic Experts Group), S3TC (S3 Texture Compression) and so forth have been placed into practical use. The former exhibits a high compression rate although it requires a comparatively high cost because data of a decoding target needs to be deployed in a memory upon display. The latter is comparatively low in compression rate. However, since it requires no deployment of decoded data, particularly where an image is locally displayed, the memory cost is low. Accordingly, one of the compression methods can be selected suitably in response to a priority order of the compression rate and the memory load which depend upon the display environments and so forth.

Meanwhile, conventionally a compression method for a moving picture gives rise to such a problem as described below because MPEG (Moving Picture Experts Group), AVC (Advanced Video Coding) and so forth have emphasized to raise the compression rate. In particular, where a moving picture is used as a video texture, even when only a portion of the moving picture is to be mapped, the overall area needs to be deployed in a memory, which requires a useless memory cost. This similarly applies to, not only a video texture, but also such a case that only a portion of a moving picture is displayed in an enlarged scale.

Especially, in the case of an inter-frame predictive coding method, also a reference image needs to be deployed over an overall area in a memory. Further, originating from a high compression rate, also the arithmetic operation cost for decoding data over an overall area is high. Furthermore, even within a period within which a region expressed by the video texture is outside the angle of view, decoding must be continued in preparation for subsequent entering into the angle of view. Therefore, even from this point, the processing cost and the memory cost for decoding are required uselessly.

Therefore, in the present embodiment, data of a moving picture is compressed such that, even if the data of the moving picture is stored into a memory while it remains in a compressed state, it is possible to extract only data in a necessary region and decode and display the data independently thereby to reduce the arithmetic operation cost and the memory cost. At this time, the data of the moving picture is compressed taking a redundancy in a frame or between frames into consideration so that high picture quality and a high compression rate are implemented with the contents of the image taken into consideration.

First, a technology for generating compressed data of a moving picture in the present embodiment is described. FIG. 1 depicts a configuration of an image processing apparatus of the present embodiment. An image processing apparatus 10 includes a wireless interface 40, an inputting apparatus 20, a display processing part 44, a display apparatus 12, a hard disk drive 50, a recording medium mounting part 52, a disk drive 54, a main memory 60, and a control part 100.

The display apparatus 12 includes one of general display units such as a liquid crystal display unit, an EL (Electronic Luminescence) display unit, and a plasma display unit. The display apparatus 12 may be provided integrally with some other module of the image processing apparatus 10 or may be connected by wire or wireless connection by using a wire cable, a wireless LAN (Local Area Network) or the like. The display processing part 44 has a frame memory (not shown) for buffering data to be displayed on the display unit of the display apparatus 12.

The wireless interface 40 is configured such that it can receive various kinds of data such as image data from a server by wirelessly connecting the wireless interface 40 to an external apparatus or a network in accordance with a predetermined wireless communication protocol. The inputting apparatus 20 is configured from a common inputting apparatus such as a joystick, a touch panel, a mouse, a keyboard, buttons and so forth. The inputting apparatus 20 includes operation means for accepting a request of a user such as selection of image data of a processing target, starting of generation of compressed data or the like. Various requesting signals inputted from the user to the inputting apparatus 20 are supplied to the control part 100.

The hard disk drive 50 functions as a storage apparatus for storing data. Various kinds of data received from the server are stored once into the hard disk drive 50. The recording medium mounting part 52 reads out, when a removable recording medium such as a memory card is mounted thereon, data from the removable recording medium. The disk drive 54 drives, when a ROM disk for read-only use is mounted thereon, the ROM disk and recognizes the same to read out data. The ROM disk may be an optical disk, a magneto-optical disk or the like. Various kinds of data such as image data may be stored in those recording media.

The control part 100 includes a multi-core CPU, and one processor core for universal use and a plurality of simple processor cores are provided in the one CPU. The processor core for universal use is called PPU (PowerPC Processor Unit) while the remaining processor cores are each called SPU (Synergistic Processor Unit). The PPU has a register, and includes a main processor as an entity for execution of arithmetic operation and efficiently allocates tasks as basic processing units of an application to be executed to the SPUs. It is to be noted that the PPU itself may execute tasks. Each SPU has a register and includes a sub processor as an entity for execution of arithmetic operation and a local memory as a local storage area.

The main memory 60 is a storage apparatus and is configured as a RAM (Random Access Memory). Each SPU has a DMA (Direct Memory Access) controller for exclusive use as a control unit and can implement high-speed data transfer between the frame memory of the display processing part 44 and the main memory 60. The control part 100 in the present embodiment implements a high-speed image processing function by causing a plurality of SPUs to operate in parallel to each other. The display processing part 44 is connected to the display apparatus 12 and outputs data of a display image.

Figure 2:
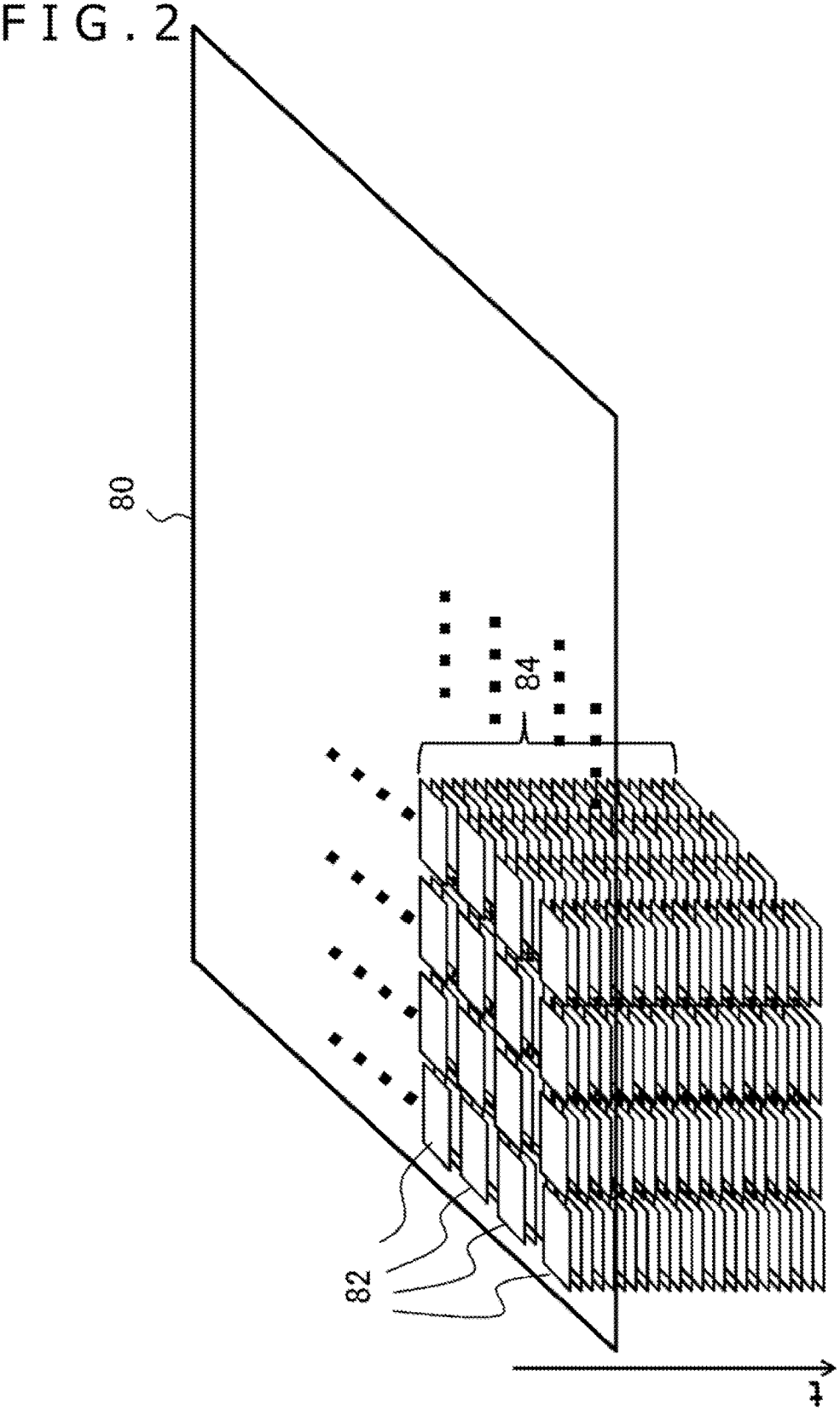
FIG. 2 is a view illustrating a processing unit of moving picture data in the present embodiment.

FIG. 2 is a view illustrating a processing unit of moving picture data in the present embodiment. In the present embodiment, image frames 80 which configure a moving picture of a compression target are each divided into a predetermined size to generate a plurality of tile images (for example, tile images 82). Since the image frames 80 of the moving picture configure an image sequence with respect to a time axis represented in a vertical direction in FIG. 2, also the tile images configure image sequences corresponding to the image sequence (for example, a tile image sequence 84).

In the present embodiment, compressed data is generated using the tile image sequence as a processing unit. Upon image display, decoded tile images are connected to each other as occasion demands to display an image. It is to be noted that, in the following description, also each of the tile images configuring the tile image sequence is referred to as "frame." Also it is to be noted that, where the number of pixels of an original image frame is smaller than a predetermined number or in a like case, division into tile images may not be performed by regarding the overall image frame as one tile.

Figure 3:
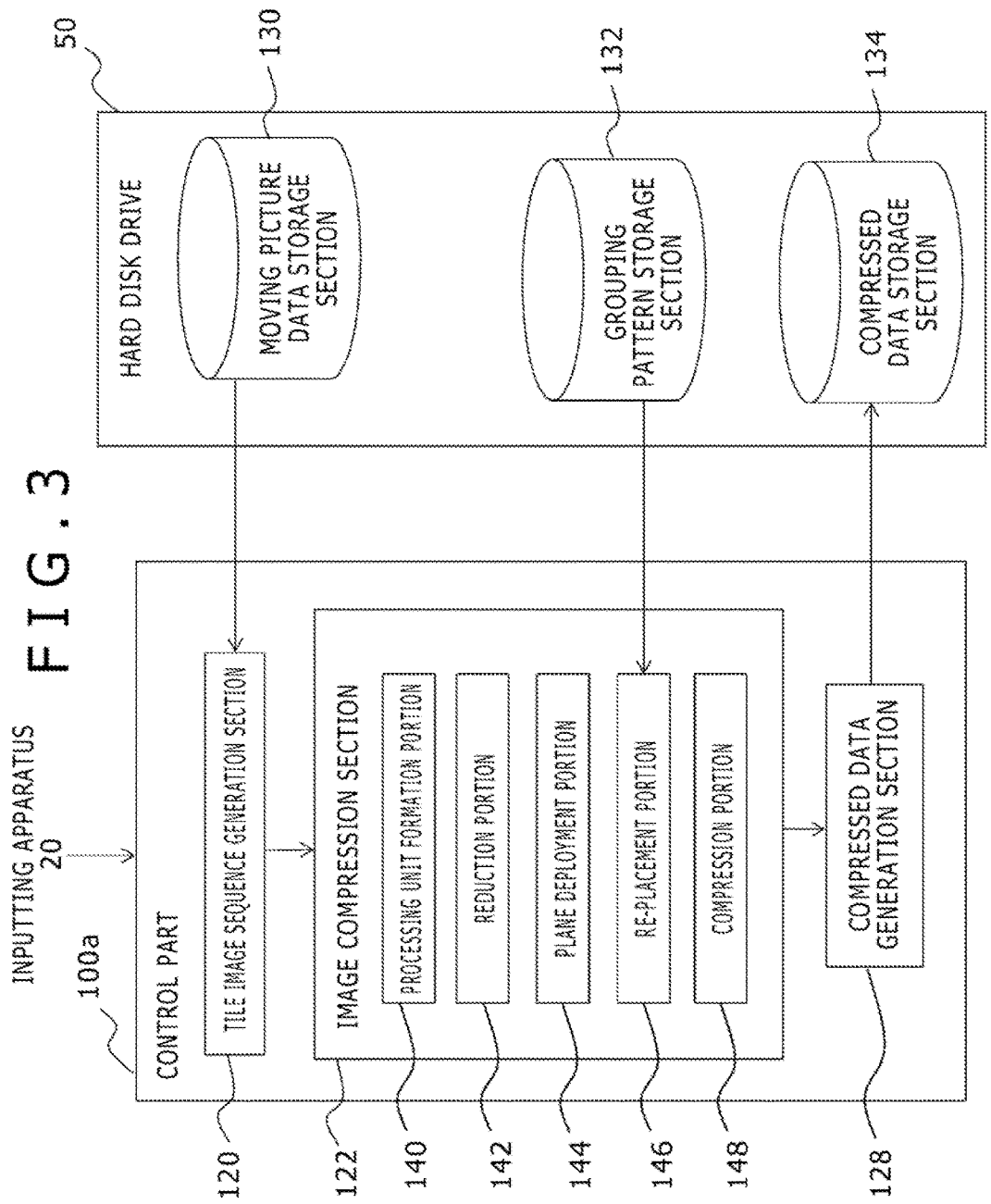
FIG. 3 is a view particularly depicting a configuration of a control part and a hard disk drive of the image processing apparatus which has a moving picture data compression function in the present embodiment.
Figure 11:
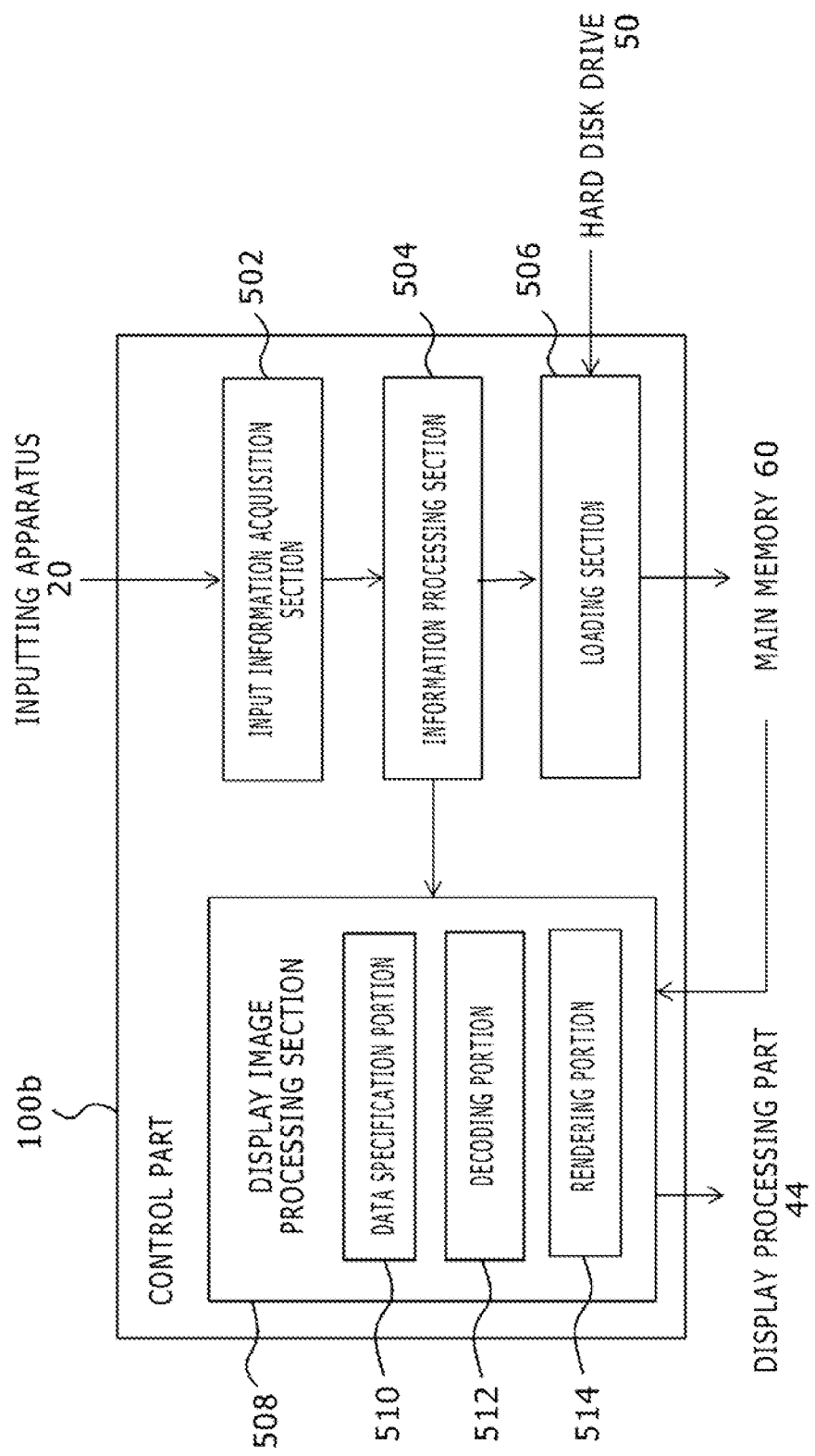
FIG. 11 is a view particularly depicting a configuration of a control part of an image processing apparatus having an image displaying function in the present embodiment.
Figure 13:
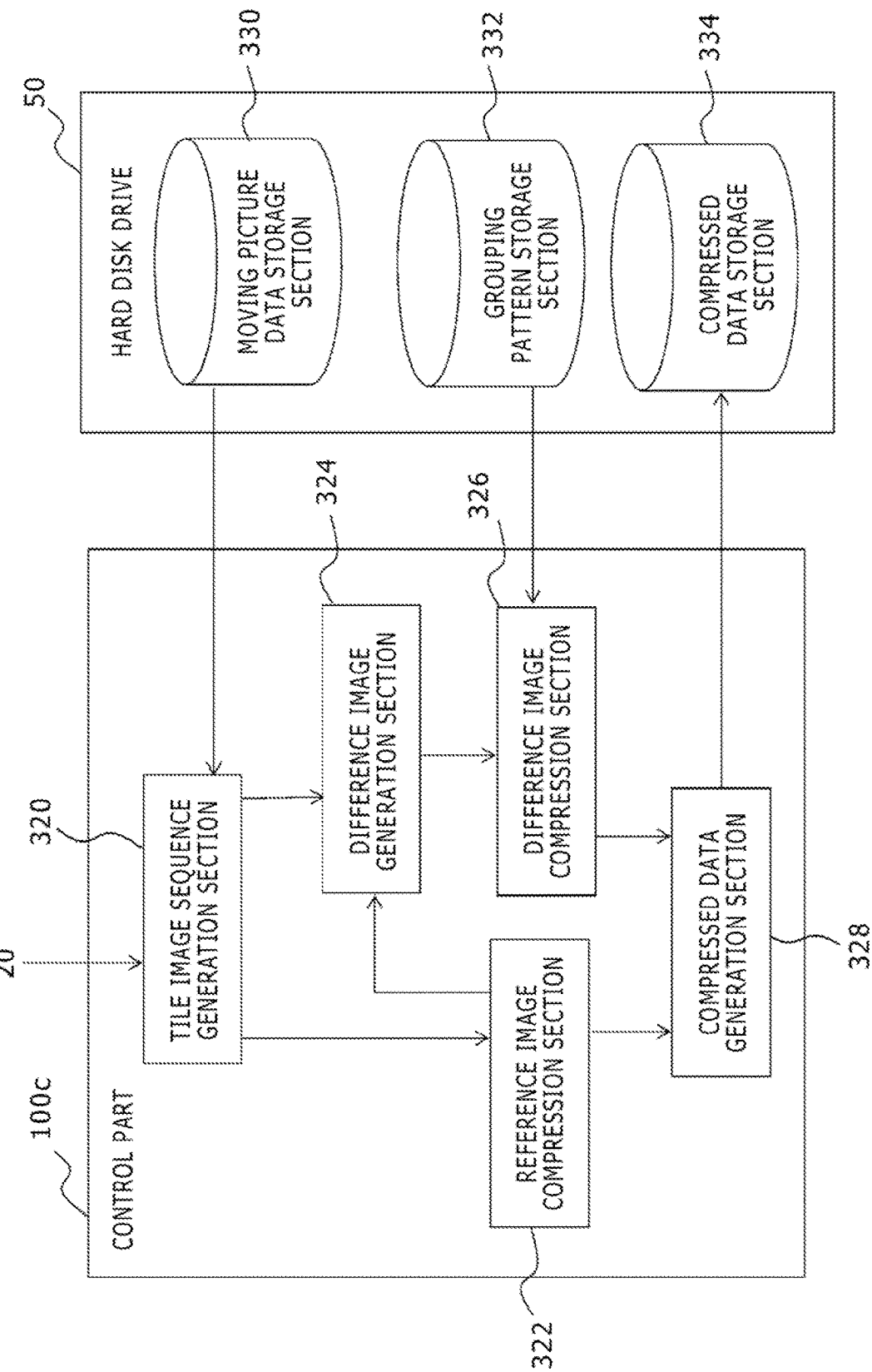
FIG. 13 is a view particularly depicting a configuration of a control part and a hard disk drive in an image processing apparatus having a function of separating moving picture data into and compressing a reference image and a difference image in the present embodiment.

FIG. 3 particularly depicts a configuration of the control part 100 and the hard disk drive 50 in the image processing apparatus 10 which has a moving picture data compression function in the present embodiment. Referring to FIGS. 3, 11, and 13, the control part 100 is formed in different forms distinguished as control parts 100a, 100b, and 100c, respectively. The control part 100a includes a tile image sequence generation section 120, an image compression section 122, and a compressed data generation section 128. The tile image sequence generation section 120 generates a tile image sequence from moving picture data of a compression target. The image compression section 122 compresses the tile image sequence for each predetermined number of frames. The compressed data generation section 128 generates final compressed data.

Referring to FIG. 3 and FIGS. 11 and 13 which are hereinafter described, components described as functional blocks for carrying out various processes can be configured, in hardware, from a CPU (Central Processing Unit), a memory, and other LSIs, and are implemented, in software, from a program loaded from a recording medium in the memory and so forth. As described hereinabove, the control part 100 has one PPU and a plurality of SPUs, and the PPU and the SPUs can individually configure the functional blocks singly or in combination. Accordingly, it can be recognized by those skilled in the art that the functional blocks can be implemented in various forms only by hardware, only by software, or by a combination of hardware and software, and they are not limited to one of hardware, software, and a combination.

The hard disk drive 50 includes a moving picture data storage section 130, a grouping pattern storage section 132, and a compressed data storage section 134. The moving picture data storage section 130 has moving picture data of a compression target stored therein. The grouping pattern storage section 132 stores therein grouping patterns for an image region upon compression process by the image compression section 122. The compressed data storage section 134 stores compressed data generated by the compressed data generation section 128. The tile image sequence generation section 120 acquires information designated by the user and relating to moving picture data of a compression target from the inputting apparatus 20 and successively reads out data of frames which configure the moving picture data from the moving picture data storage section 130. Then, the tile image sequence generation section 120 divides the frames into a predetermined size to generate a tile image sequence.

The image compression section 122 includes a processing unit formation portion 140, a reduction portion 142, a plane deployment portion 144, a re-placement portion 146, and a compression portion 148. The processing unit formation portion 140 divides a tile image sequence generated by the tile image sequence generation section 120 further into a predetermined size in each of the space direction and the time direction. A partial image sequence produced by the division is hereinafter referred to as "voxel," and data of the voxel is hereinafter referred to as "voxel data." The reduction portion 142 reduces each of voxel data, which can be represented by an average image depending upon the redundancy thereof, in the time direction or the space direction, or in both directions by substituting the average image into the voxel data.

The plane deployment portion 144 deploys data in the time direction included in the voxels on a two-dimensional plane and successively connects voxel data included in a tile image sequence to form a single integrated image. As a result of the reduction process by the reduction portion 142, the voxel data have various sizes. Therefore, the plane deployment portion 144 generates also index information which associates the position of each voxel data in an integrated image with a position of the voxel in an original tile image.

The re-placement portion 146 forms groups of pixels in a region of each voxel data in the integrated image and re-places the pixels in a unit of a group. At this time, the re-placement portion 146 selects an optimum grouping pattern from the grouping pattern storage section 132 of the hard disk drive 50. Here, the "optimum grouping pattern" signifies a delimiting manner of a group of pixels which minimizes a quantization error arising from a compression process of an integrated image which is carried out subsequently by the compression portion 148. The re-placement portion 146 generates also grouping pattern information representative of the selected pattern.

The compression portion 148 compresses an integrated image after the re-placement in accordance with a predetermined method. For example, if S3TC is adopted, then if the position of needed voxel data in the integrated image is found, then only the region at the position can be decoded. For the process of extracting data at a designated position from a compressed image and decoding the data, general graphics hardware provided in a GPU or the like can be utilized as it is. Accordingly, image display in the present embodiment can be implemented at a low cost utilizing existing hardware by introducing a function appropriately designating the position of needed voxel data and a function of appropriately restoring placement of decoded pixels. It is to be noted that the compression method is not limited to S3TC but may be any of practically used methods such as JPEG.

The compressed data generation section 128 associates data after compression of an integrated image by the compression portion 148, index information generated by the plane deployment portion 144, and grouping pattern information generated by the re-placement portion 146. The compressed data generation section 128 associates, after it carries out the process just described for each tile image sequence, the position, frame number and so forth of the tile image sequence in a frame of an original moving picture to obtain final compressed data. The generated compressed data are outputted to the compressed data storage section 134.

Figure 4:
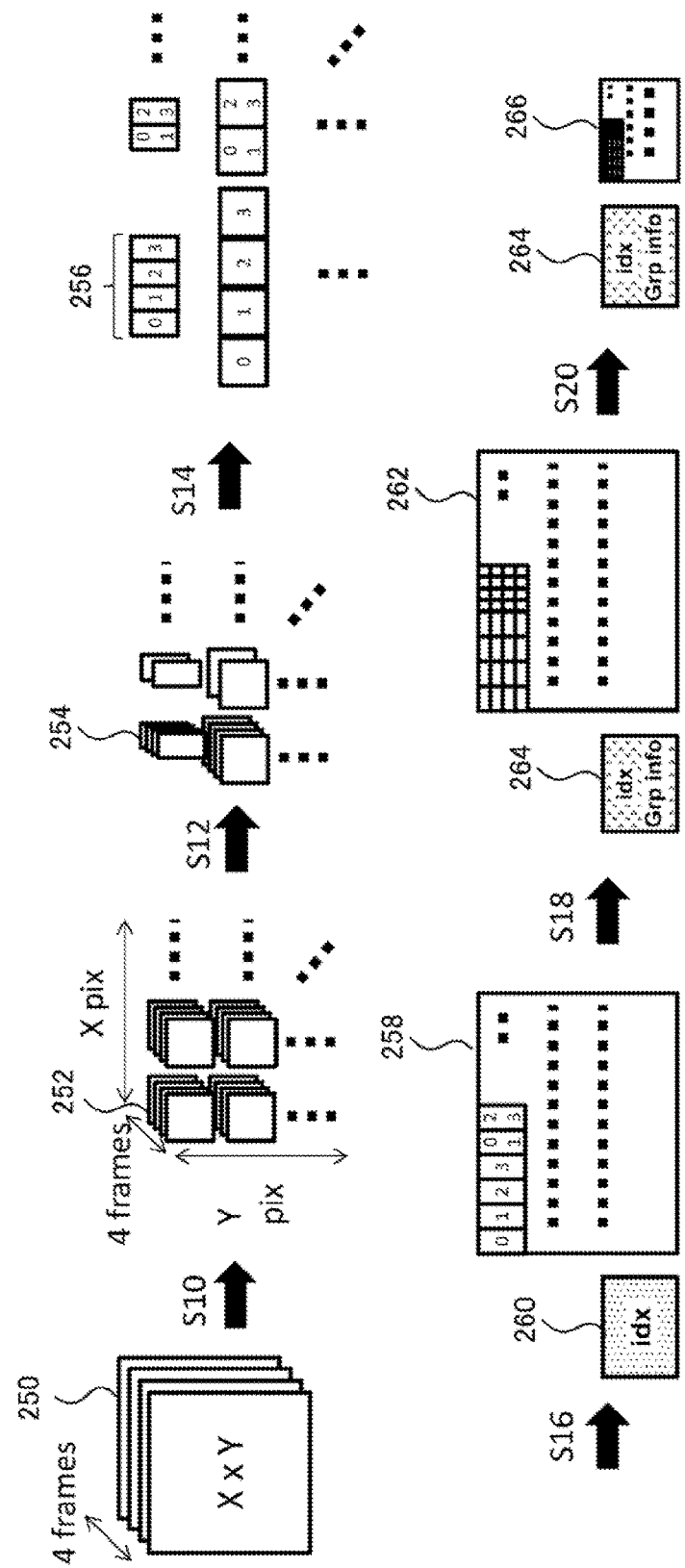
FIG. 4 is a view schematically illustrating a basic compression procedure carried out by an image compression section in the present embodiment.

FIG. 4 schematically illustrates a basic compression procedure carried out by the image compression section 122. First, four frames of tile images (tile image sequence 250) having a size of X pixels in the horizontal direction and Y pixels in the vertical direction are determined as a unit of compression. The processing unit formation portion 140 further divides the tile image sequence 250 for such four frames into a predetermined size on an image plane to generate voxels (for example, voxels 252) (S10). Each voxel is a partial image sequence configured, for example, from 8 pixels×8 pixels×4 frames. Although the following description is given in accordance with this example, the number of frames of a processing unit, the size of voxels, and units of various processes carried out at succeeding stages can be varied in various manners.

Then, the reduction portion 142 confirms the presence or absence of redundancy in the space direction and the time direction for each voxel and reduces, if it is decided that the voxel has redundancy, the data in the direction of the redundancy (S12). In particular, even if images are averaged in the space direction or the time direction or else in both of the space and time directions, if the difference of the average image from the original images is small, then the original images are put together as an average signal to reduce the images (for example, a reduced image sequence 254). The plane deployment portion 144 deploys the sequence of the voxel data in the time direction on a two-dimensional plane (S14) irrespective of whether or not being reduced. In FIG. 4, a voxel image 256 is a row in which four frames included in the reduced image sequence 254 are arranged in a rightward direction, and each of the numbers "0" to "3" in the rectangles represents a frame number. While this applies also to the other voxel images, an average image in the time direction has an averaged frame number indicated in one rectangle.

Then, the plane deployment portion 144 lines up the voxel images on an image plane of a predetermined size to generate one integrated image 258 (S16). At this time, the plane deployment portion 144 generates also index information 260 which associates the position of each voxel on the original image with a position of the data on the integrated image 258. Then, the re-placement portion 146 selects a grouping pattern, which exhibits a minimum quantization error, for each voxel and collectively places the pixels in the region of each voxel image for each group to update the integrated image (integrated image 262) (S18). At this time, the re-placement portion 146 adds information of the selected grouping pattern to the index information described hereinabove to generate reference information 264.

Thereafter, the compression portion 148 compresses the integrated image 262 after the re-placement in accordance with a predetermined compression method to generate a compressed image 266 (S20). As a result, the compressed image 266 and the reference information 264 are generated for the inputted tile image sequence 250 for four frames. The compressed data generation section 128 associates the data with each other. Such a process as described above is repeated for all of the other tile image sequences for each four frames. Further, the process just described is repeated for every four frames to compress the entire moving picture data.

Figure 5:
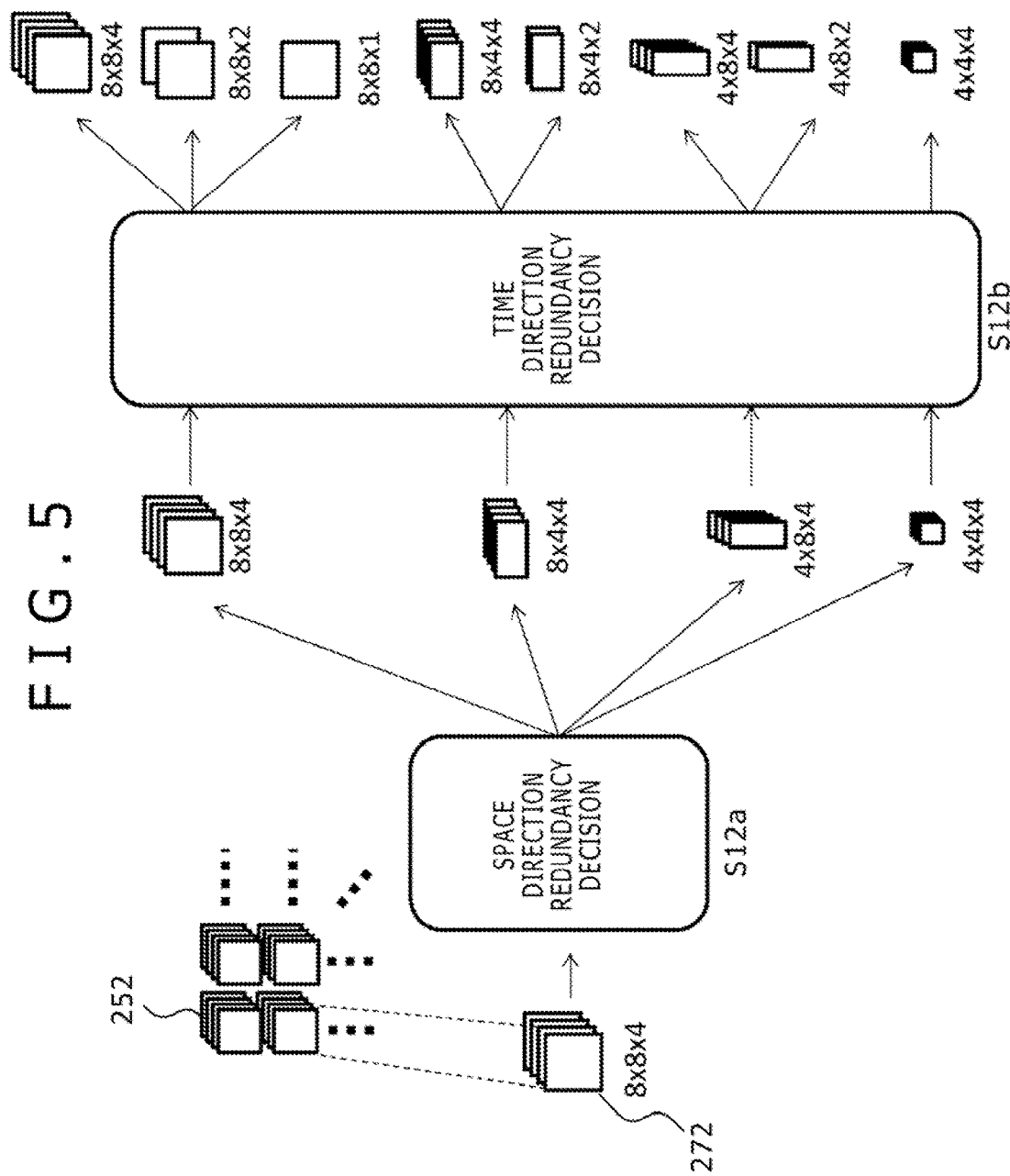
FIG. 5 is a view schematically illustrating a procedure for reducing generated voxel data by a redundancy decision in the present embodiment.

FIG. 5 schematically illustrates a procedure for reducing voxel data generated at S10 of FIG. 4 by a redundancy decision at S12. When a voxel of 8×8 pixels×4 frames is to be generated as described above, if it is assumed that a tile image is configured from 256×256 pixels, then a voxel 272 is configured from four frames of images obtained by dividing a tile image by 32 in each of the vertical direction and the horizontal direction. In FIG. 5, below each data block, a data size is indicated in the form of "pixel number in the horizontal direction X pixel number in the vertical direction X frame number." This similarly applies also to the succeeding figures.

The redundancy is decided for each of the voxels 272 formed in such a manner as described above. In FIG. 5, a redundancy decision in a space direction is carried out first (S12a). In particular, the image is reduced by a predetermined magnification in the vertical direction and the horizontal direction, and an image obtained by returning the size of the reduced image to the original size and the image before the reduction are compared with each other for each frame. If the sum total of the differences between the pixel values is equal to or lower than a threshold value, then it is decided that some redundancy exists in the space direction. The image is then compressed by reducing the same by a magnification with which the reduction amount is comparatively great from among those reduction magnifications with which the sum total is equal to or lower than the threshold value. In the example of FIG. 5, one half in the vertical direction, one half in the horizontal direction, and one half in the vertical and horizontal directions are set as candidates for the reduction magnification.

Accordingly, as depicted in FIG. 5, a case in which there is no redundancy in the original image and the image of 8×8 pixels remains as it is and different cases in which the image is reduced into 8×4 pixels, 4×8 pixels, or 4×4 pixels appear depending upon the decision at step S12a. Since the decision is carried out in a group of every four frames, it may be determined that the original image can be reduced if it is found, when the sum total of the differences between pixel values is compared with the threshold value for every one frame, that the sum total is equal to or lower than the threshold value with regard to all of the four frames. Alternatively, a threshold value decision may be carried out for the sum total of the differences between pixel values for four frames.

Next, a redundancy decision in a time direction is carried out for the images placed in one of the four states described hereinabove (S12b). In particular, an image is generated by averaging a predetermined number of successive frames, and the generated image is compared with the image of the original frames. If the sum total of the differences between pixel values is equal to or lower than a threshold value, then it is decided that a redundancy exists in the time direction. In this case, since it is equivalently decided that a plurality of frames can be collectively represented by one average image, an average image with which a greatest number of frames can be collected from among average images wherein the sum total is equal to or lower than the threshold value is replaced into the frames to compress the image. In the example of FIG. 5, a case in which averaging is carried out for every two frames to generate two average images and another case in which averaging is carried out for four frames to generate one average image are set.

However, in the example of FIG. 5, a case in which an image for four frames is represented by one average image is set only for an image having 8×8 pixels. Further, the compression in the time direction is not carried out for an image having 4×4 pixels. In this case, as a result of the decision at S12b, as depicted in FIG. 5, cases occur in which eight kinds of data structures of 8×8 pixels×4 frames, 8×8 pixels×2 frames, 8×8 pixels×1 frame, 8×4 pixels×4 frames, 8×4 pixels×2 frames, 4×8 pixels×4 frames, 4×8 pixels×2 frames, and 4×4 pixels×4 frames appear including also a case in which the compression in the time direction is not carried out.

Similarly to the decision with regard to a redundancy in the space direction, the decision may be carried out such that the sum total of the differences between pixel values is compared with a threshold value for every one frame of the original image and compression is permitted under the condition that the sum total is equal to or lower than the threshold value with regard to all four frames. Alternatively, the threshold value decision may be carried out for the sum total of the differences between pixel values for four frames. It is to be noted that the choices for the reduction magnification and the reduction number of frames are not limited to those depicted in FIG. 5, but may be suitably determined, for example, in response to the size of the original voxel, the restriction on the data size upon deployment on a two-dimensional plane or the like. Also the order of the redundancy decision in the space direction and the redundancy decision in the time direction may be reversed from that depicted in FIG. 5. Alternatively, both decisions may be carried out at the same time by carrying out reduction in the space direction and reduction in the time direction in various combinations. Alternatively, only one of the decisions may be carried out.

Figure 6:
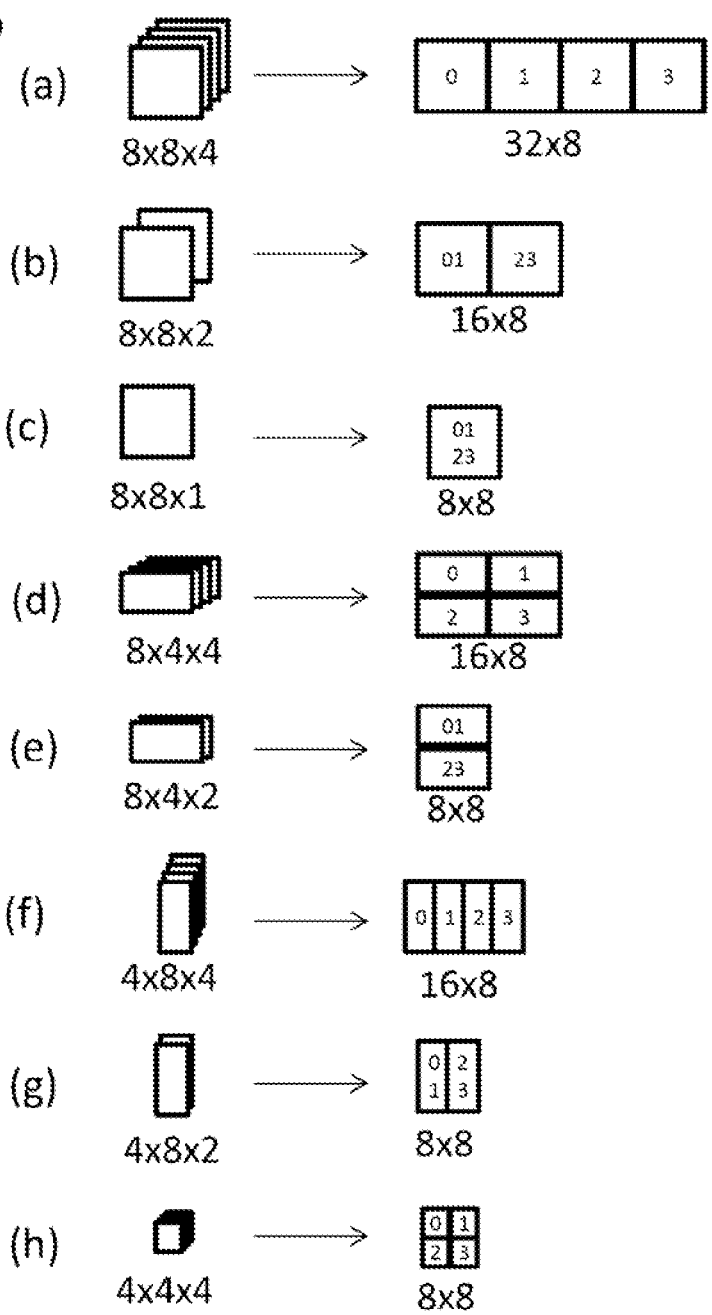
FIG. 6 is a view schematically illustrating a manner in which an image in a time direction included in each voxel is expanded on a two-dimensional plane to generate a voxel image in the present embodiment.

FIG. 6 schematically illustrates a manner in which images in the time direction included in each voxel are deployed on a two-dimensional plane to generate a voxel image at S14 of FIG. 4. As illustrated in FIG. 5, each voxel has one of the eight different data structures, and in FIG. 6, the data structures are depicted on the left side. For each of such data structures, the placement direction of the images in a voxel image is determined for each of the data structures as depicted on the right side of arrow marks in (a) to (h).

The voxel images have an equal size in the vertical direction irrespective of the pattern thereof. In FIG. 6, the voxel images include eight pixels in the vertical direction, and under this limitation, the images in the voxel images are placed in a raster order. It is to be noted that the numeral in each rectangle indicates a frame number similarly as in FIG. 4, and if a plurality of numerals are included in a rectangle, then this represents that the image is an average image of a plurality of frames. As depicted in (a), data of 8×8 pixels×4 frames are lined up in a rightward direction as they are in an order of the frames. Also in data in (b), (f), and (g), the size of the frames in the vertical direction is 8 pixels, and therefore, the data are lined up as they are in the rightward direction.

The data of 8×4 pixels×4 frames in (d) include four pixels in the vertical direction, and therefore, the 0th and first frames are lined up in the rightward direction, and then the second and third frames are lined up in the rightward direction below the 0th and first frames. Also the data of 4×4 pixels×4 frames in (h) are lined up similarly. The data of 8×4 pixels×2 frames in (e) are lined up in the vertical direction. The data of 8×8 pixels×1 frame in (c) are used as they are as a voxel image. By using such rules as described above, a voxel image including 8 pixels in the vertical direction can be generated in all of the data structures. However, if the association between the frame number and the position of the frame is established, then the arrangement direction is not limited to the patterns depicted in FIG. 6.

Figure 7:
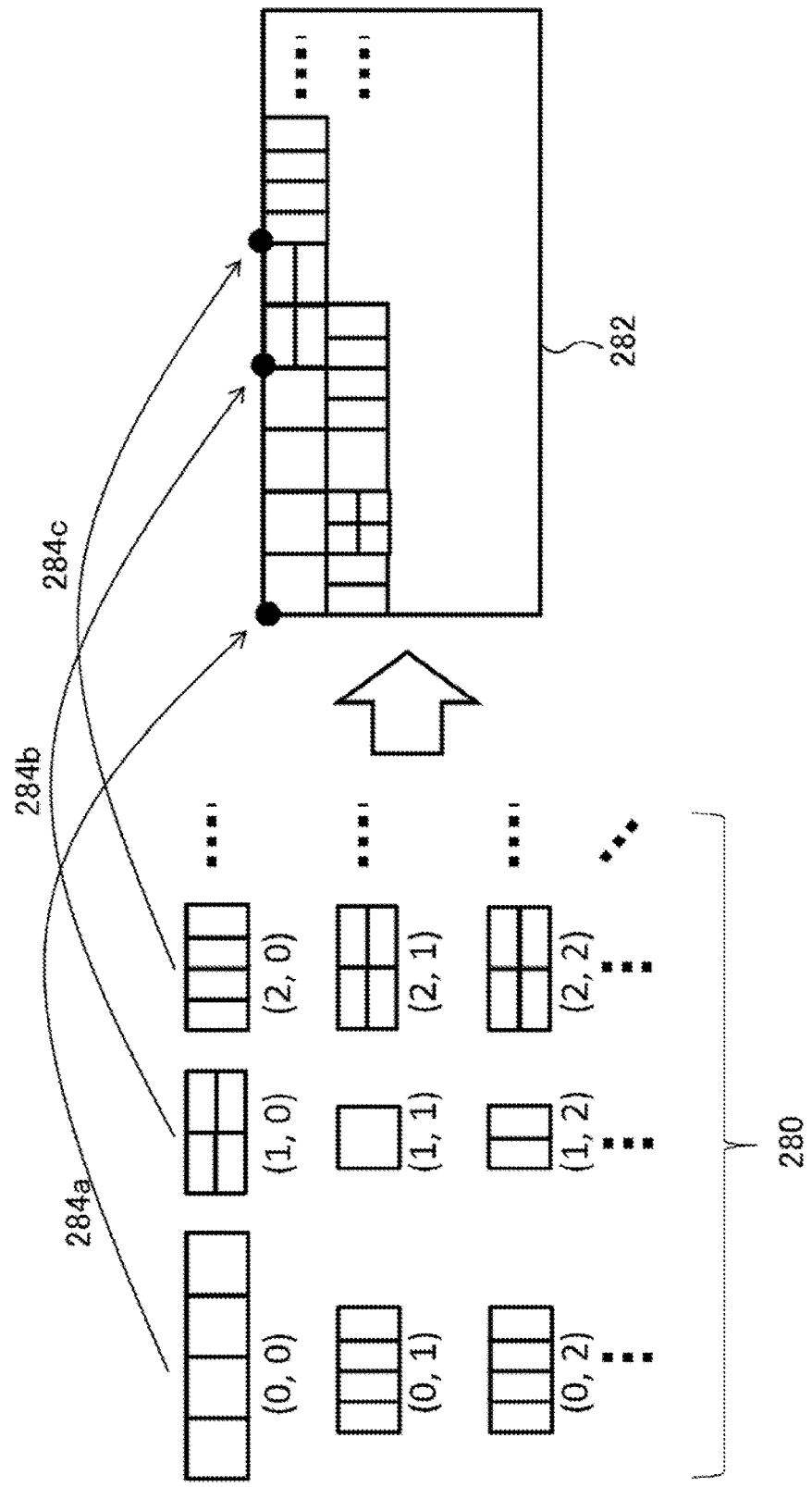
FIG. 7 is a view schematically illustrating a manner in which voxel images are connected to form one integrated image in the present embodiment.

FIG. 7 schematically illustrates a manner in which voxel images are connected to form a single integrated image at S16 of FIG. 4. Since a voxel is obtained by spatially dividing for frames of tile images, the voxel images are associated with position coordinates (0, 0), (1, 0), (2, 0), . . . representative of a two-dimensional array of the original tile images (two-dimensional array 280). An integrated image 282 is generated by lining up corresponding voxel images in similar orders on an image plane of a predetermined size in a raster order of the two-dimensional array 280. By unifying the size in the vertical direction of voxel images, the height of one line when the voxel images are lined up can be unified. Consequently, the data can be laid without a gap and besides reference upon display is facilitated.

Since the horizontal width of the voxel images has a variable length although it is a multiple of 8 pixels from the deployment rule described hereinabove, also index information for associating the position of each voxel in the original tile image and the position of the voxel image in the integrated image 282 is generated. For example, as illustrated in FIG. 7, with the position coordinates (0, 0) of the left upper voxel of the two-dimensional array 280, the coordinates of the left upper corner of the corresponding voxel image of the integrated image 282 is associated (arrow mark 284a). Similarly, with regard to the position coordinates (1, 0), (2, 0), . . . of the succeeding voxels, association information represented by arrow marks 284b, 284c, . . . is recorded.

Figure 8:
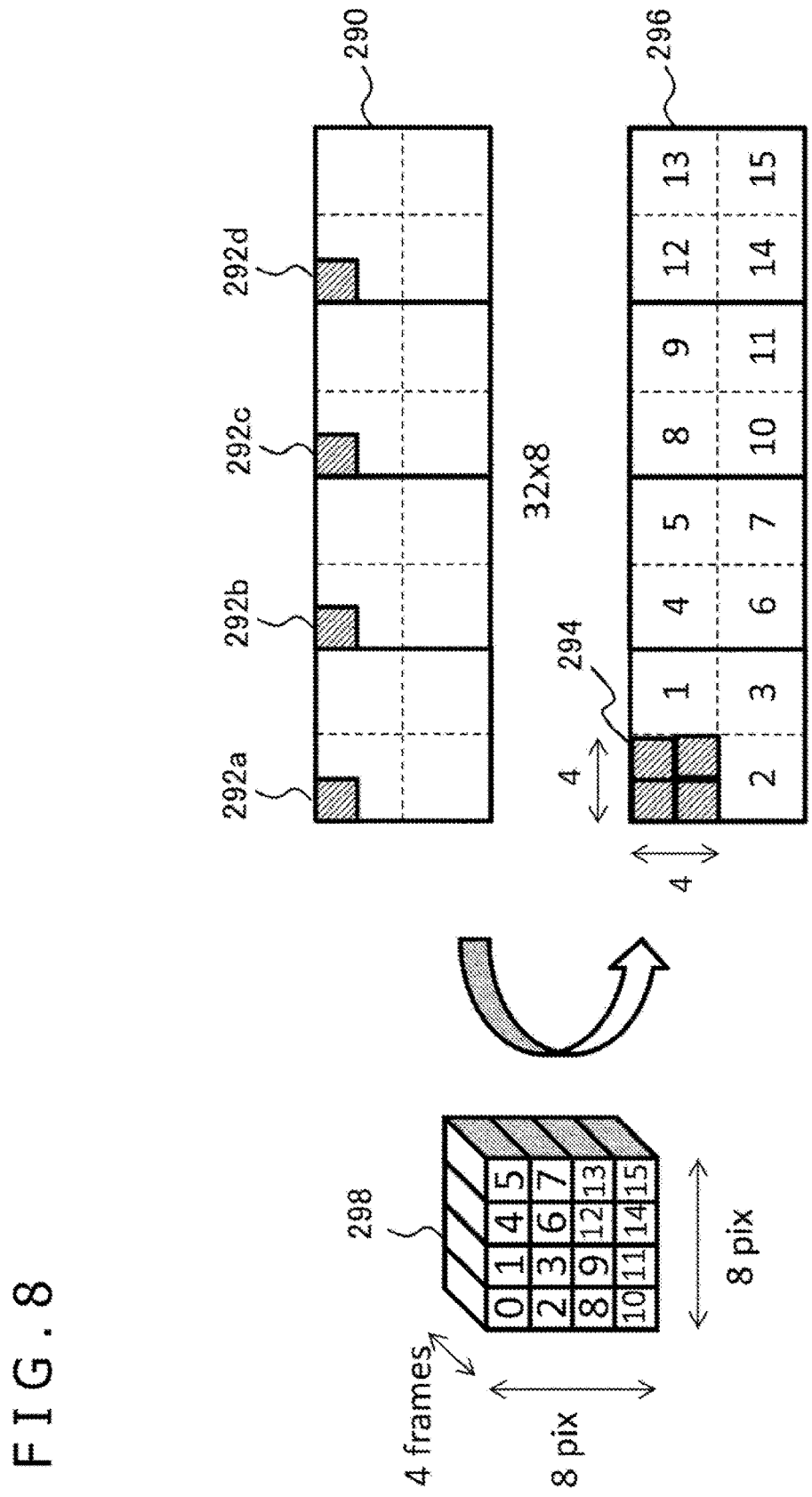
FIG. 8 is a view schematically illustrating a manner in which images are put together for each group in a voxel image in the present embodiment.

FIG. 8 illustrates a manner in which images are put together for each group in a voxel image at S18 of FIG. 4. The present embodiment has a unique characteristic that partial images contiguous to each other in the time direction in a moving picture, namely, partial images between which the variation is small, are lined up on a two-dimensional plane. Accordingly, it is considered that, in a voxel image obtained as a result of the lining up, image regions in which the difference between pixel values is small, namely, similar image regions, appear periodically. This nature of the integrated image is utilized to suppress a quantization error, which is generated upon compression, thereby to prevent degradation of the picture quality.

In the case of S3TC, pixel values of 16 pixels included in each region of 4×4 pixels are quantized. In particular, each of pixel values is represented by a value indicated by one of two representative colors of the pixels and a neutral color obtained by linearly interpolating the two representative colors. At this time, the quantization error which appears increases as the displacement of the original pixel values from the line which interpolates the representative colors, namely, as the variance of the original pixel values increases. On the contrary, as the pixel values of the 16 pixels come closer to each other, the quantization error decreases and degradation of the picture quality can be suppressed. Therefore, the nature of the integrated image described above is utilized to form a group of pixels in accordance with a policy of putting together pixels having comparatively close pixel values to a region of 4×4 pixels.

The upper stage in FIG. 8 depicts a certain voxel image 290 and the lower stage depicts an image 296 after re-placement. The voxel image 290 corresponds, for example, to voxel images lined up first (left upper corner) in the integrated image 282 of FIG. 7. If it is assumed that the region of 8×8 pixels of a corresponding voxel represents, for example, part of the blue sky of the original image, then it is considered that all pixels included in small regions 292a, 292b, 292c, and 292d indicated by slanting lines have pixel values close to each other and representing the blue. Therefore, such small regions 292a, 292b, 292c, and 292d are grouped and put together into one region 294.

If it is assumed that the original small regions 292a, 292b, 292c, and 292d include 2×2 pixels so that the region 294 of the re-placement destination of the image 296 after the re-placement includes 4×4 pixels as depicted in FIG. 8, then the 16 pixels of the quantization unit have close values to each other. Consequently, the quantization error can be suppressed. Also with regard to different regions, by extracting regions from the same position of frames for each 2×2 pixels and putting them together into regions of 4×4 pixels similarly, the variance of the pixel values of the pixels included in the quantization unit can be suppressed.

On the left side in FIG. 8, grouping patterns at this time are depicted. A voxel data 298 is represented by a rectangular parallelepiped having a front face as an image plane of 8×8 pixels and having a depthwise direction as a time direction corresponding to four frames. The process described above signifies that 16 regions obtained by dividing such voxel data 298 into four in both of the vertical and horizontal directions are put together for four frames in the time direction to make one group. Each of rectangular parallelepipeds denoted by the numbers of "0" to "15" in the voxel data 298 represents one group.

For example, the group "0" is configured from the small regions 292a, 292b, 292c, and 292d and is put together into a region 294 of the image 296 after re-placement. The re-placement destination of the other groups are regions of the same numbers applied to the regions of 4×4 pixels in the image 296 after re-placement. However, since the compression process is carried out independently for each region, the ordering of the re-placement destination is not limited particularly. While FIG. 8 illustrates an example wherein regions of 2×2 pixels for four frames are put together into regions of 4×4 pixels as a group. The grouping may be carried out in various other patterns. Possible and optimum patterns differ depending upon the data structures for the voxel depicted in FIG. 6 and the substance of the image.

Figure 9:
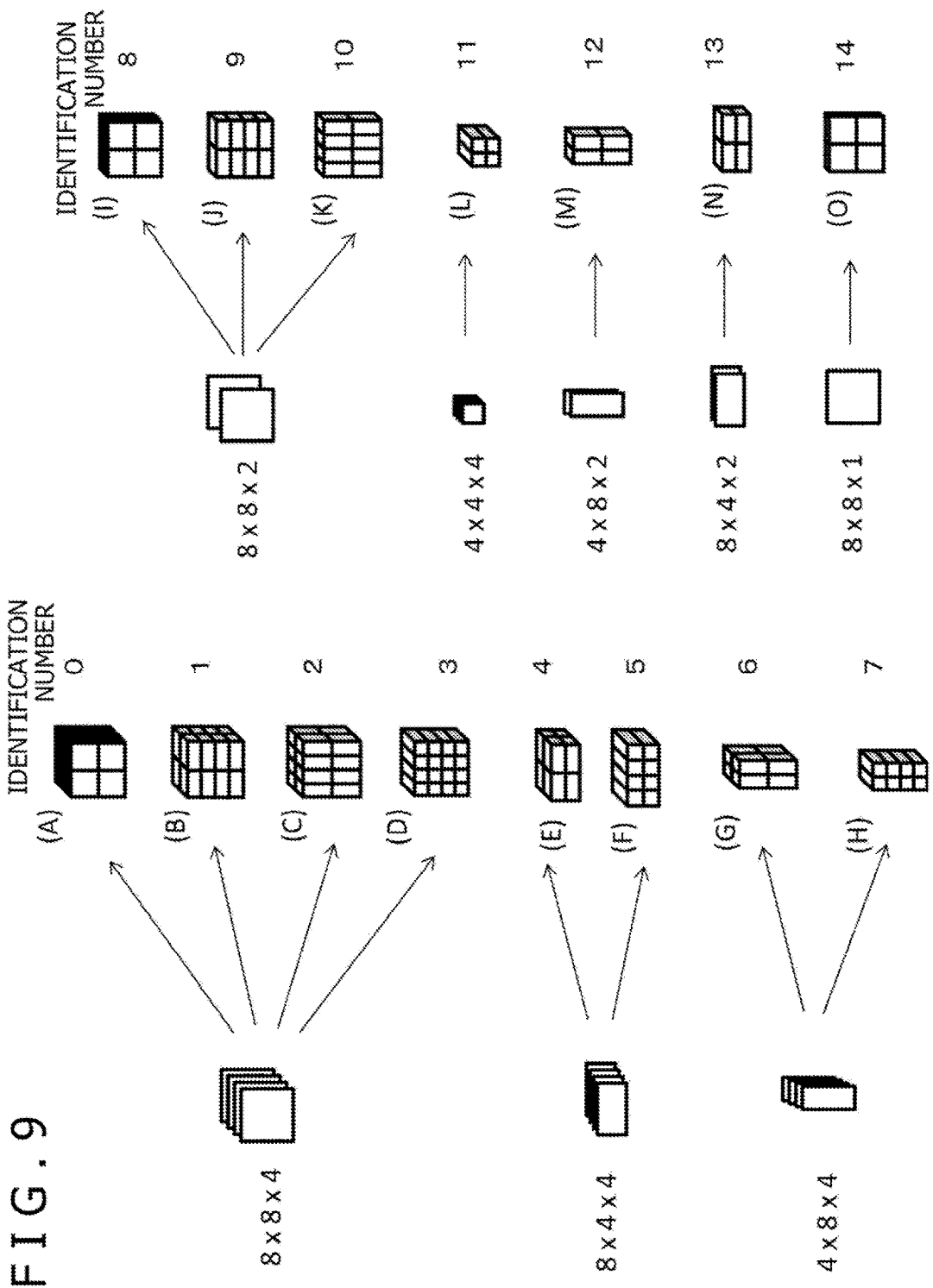
FIG. 9 is a view illustrating grouping patterns which can be selected for data structures of voxels in the present embodiment.

Therefore, variations of the grouping patterns are prepared and stored into the grouping pattern storage section 132. Then, a pattern with which least degradation is exhibited when all possible patterns are applied to data structures of voxels to compress voxel images and then the voxel images are decoded is selected. For example, decoded voxel images and an original voxel image are compared with each other for each pixel, and the decoded voxel image which exhibits the smallest total value of differences is selected. FIG. 9 illustrates grouping patterns which can be selected for different data structures of voxels. As described hereinabove, in all patterns, 16 pixels to be put together into a region of 4×4 pixels make one group.

First, for voxel data of 8×8 pixels×4 frames, a pattern (D) is prepared in which totaling 16 groups each configured from 2×2 pixels×4 frames are formed. Further, a pattern (A) in which a group is formed from 4×4 pixels×1 frame, a pattern (B) in which a group is formed from 4×2 pixels×2 frames, and a pattern (C) in which a group is formed from 2×4 pixels×2 frames are prepared. Furthermore, for data of 8×4 pixels×4 frames, a pattern (E) in which eight groups are formed from each 4×2 pixels×2 frames and a pattern (F) in which a group is formed from 2×2 pixels×4 frames are prepared.

For data of 4×8 pixels×4 frames, a pattern (G) in which eight groups are formed from each 2×4 pixels×2 frames and a pattern (H) in which a group is formed from each 2×2 pixels×4 frames are prepared. For data of 8×8 pixels×2 frames, a pattern (I) in which eight groups are formed from each 4×4 pixels×1 frame, a pattern (J) in which a group is formed from each 4×2 pixels×2 frames, and a pattern (K) in which a group is formed from each 2×4 pixels×2 frames are prepared.

For data of 4×4 pixels×4 frames, a pattern (L) in which four groups are formed from each 2×2 pixels×4 frames is prepared. For data of 4×8 pixels×2 frames, a pattern (M) in which four groups each including 2×4 pixels×2 frames is prepared. For data of 8×4 pixels×2 frames, a pattern (N) in which four groups each including 4×2 pixels×2 frames are prepared. For data of 8×8 pixels×1 frame, a pattern (O) in which four groups each including 4×4 pixels×1 frame are prepared.

Identification numbers "0" to "14" are applied to the patterns, and a selected pattern is recorded as reference information together with the index information described hereinabove. Consequently, a data structure of a voxel and a re-placement destination of grouped pixels can be specified at the same time. As a result, the position of pixels suitable for display can be specified in a voxel image. It is to be noted that, since the unit or the characteristic of the compression process differs depending upon the compression method of an integrated image carried out by the compression portion 148, preferably a desirable variation of the grouping pattern is prepared for each compression method.

Figure 10:
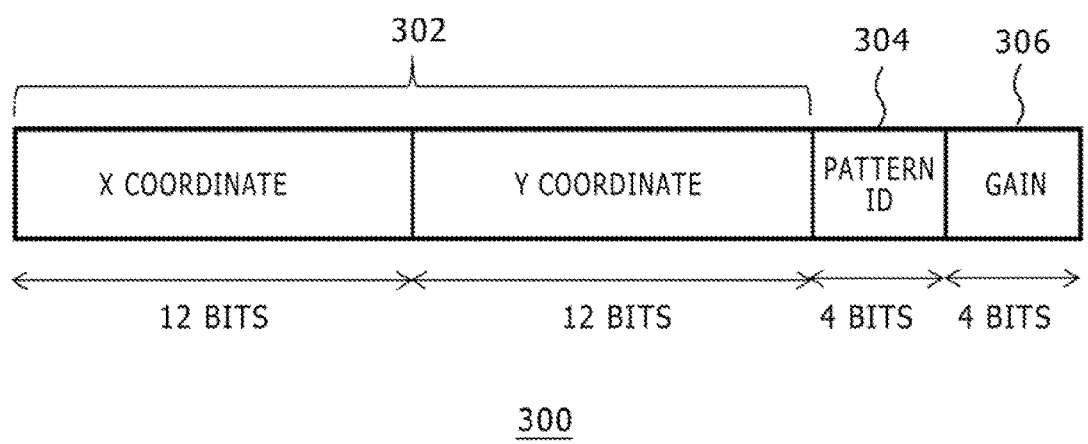
FIG. 10 is a view illustrating an example of a data structure of reference information including an index information and grouping pattern information associated with a certain voxel in the present embodiment.

FIG. 10 illustrates an example of a data structure of reference image including index information and grouping pattern information associated with a certain voxel. Reference information 300 includes index information 302, grouping pattern information 304, and gain information 306. The index information 302 indicates position coordinates of a corresponding voxel image in an integrated image. Since the re-placement described hereinabove with reference to FIG. 8 is closed in each voxel image, the position coordinates do not vary from the position coordinates in the integrated image 282 depicted in FIG. 7. In short, the index information 302 is information indicated by the arrow marks 284a, 284b, 284c, . . . in FIG. 7.

The grouping pattern information 304 indicates an identification number of a selected pattern from among the variations of the grouping pattern described hereinabove with reference to FIG. 9, namely, a "pattern ID." The gain information 306 indicates a value of a gain recorded only for a difference image when each frame of an original moving picture is compressed separately in regard to a reference image and a difference image thereof as hereinafter described. However, where such a configuration as just described is not applied, the gain information 306 may be made an invalid region, or the data length of the other information may be increased. In any case, regions are allocated such that regions of 12 bits are allocated to the X coordinate and the Y coordinate of the index information 302, a region of 4 bits is allocated to the grouping pattern information 304, and besides a region of 4 bits is allocated to the gain information 306 such that 32 bits=4 bytes are allocated to each one voxel, then information corresponding to one pixel of an RGBA image is obtained.

If it is assumed that one voxel is configured from 8×8 pixels×4 frames, then reference information for 4 frames of tile images of 256×256 pixels can be made an image of 32×32 pixels×1 frame. It is to be noted that, if such an image is generated for each succeeding four frames and the generated images are connected into 8×8 two-dimensional arrays, then reference information of tile image sequence for 4×8×8=256 frames can be made one image of 256×256 pixels equal to the size of the tile images. The compressed data generation section 128 stores an image of such reference information and a compressed integrated image in an associated relationship with each other and further in association with the position of an original tile image and so forth into the compressed data storage section 134.

Now, a technology for displaying an image using data compressed by the method described hereinabove is described. Also an apparatus for carrying out image display in the present technology can be implemented by a configuration similar to that of the image processing apparatus 10 shown in FIG. 1. In the following, description is given principally of the configuration of the control part 100. FIG. 11 particularly depicts a configuration of a control part 100b having an image displaying function in the present embodiment. The image processing apparatus 10 including the control part 100b basically is an apparatus which carries out displaying a moving picture using at least part of moving picture data compressed in such a manner as described above. However, a purpose or a displaying mode for displaying a moving picture is not limited specially.

For example, the image processing apparatus 10 may display any of a movie or a picked up moving picture stored in the hard disk drive 50 or the like, a moving picture stream distributed on the real time basis, a video texture in computer graphics and so forth. Alternatively, a plurality of moving pictures may be displayed at the same time, or a moving picture may be used only in a partial region of a display image. Accordingly, in the hard disk drive 50, not only such compressed integrated image and reference information as described above, but also various data such as programs for implementing various functions and other image data may be stored.

The control part 100b includes an input information acquisition section 502, an information processing section 504, a loading section 506, and a display image processing section 508. The input information acquisition section 502 acquires information inputted by a user from the inputting apparatus 20. The information processing section 504 carries out information processing in response to an input by the user or the like. The loading section 506 loads necessary compressed data of a moving picture. The display image processing section 508 renders an image frame.

The input information acquisition section 102 acquires starting/ending of a function provided by the image processing apparatus 10 and various kinds of input information accepted by the function, inputted to the inputting apparatus 20 by the user. The input information acquisition section 502 notifies the information processing section 504 of the acquired information. The function provided by the image processing apparatus 10 may be a moving picture displaying function or any of various functions of a game, communication and so forth. Accordingly, also the input information acquired by the input information acquisition section 502 differs variously depending upon the function.

In the present embodiment, random access to a moving picture in a space direction and a time direction is implemented readily. Accordingly, a mode for accepting an operation involving a change of a display region of a moving picture such as a viewpoint moving operation of the user for enlargement, reduction, or scrolling of a moving picture being displayed or an operation for a game in which computer graphics to which a video texture is mapped are displayed is particularly effective.

The information processing section 504 carries out information processing in accordance with a function provided by the image processing apparatus based on input information acquired by the input information acquisition section 502. For example, when a viewpoint moving operation is accepted, the information processing section 504 determines a moving amount of the display region after every time step based on the operation amount of the viewpoint moving operation and sequentially calculates coordinates of a next display region. Where a game is to be executed, the information processing section 504 generates a three-dimensional object in accordance with the contents of the game or progresses the stage in accordance with a game program. Since the processes can be carried out by applying a common technology, the following description is given principally of processes relating to display of a moving picture while description of other processes is omitted suitably.

The information processing section 504 calculates frame coordinates of a display region in such a case that it becomes necessary to display a moving picture or it becomes necessary to change the display region of a moving picture as a result of carrying out such information processing as described above. The information processing section 504 then notifies the loading section 506 and the display image processing section 508 of the calculated frame coordinates. In the present embodiment, since individual compressed data are generated in units of tile images or in units of a predetermined number of frames, also loading from the hard disk drive 50 into the main memory 60 can be carried out in this unit.

Therefore, the information processing section 504 measures the elapsed time from a point of time at which display of a moving picture is started and issues a notification of a frame number based on the elapsed time together with the information of the frame coordinates. Consequently, the loading section 506 and the display image processing section 508 can specify compressed data of a loading target or a decoding target irrespective of whether or not the pertaining tile image has been a processing target till then. Here, the compressed data includes compressed data of an integrated image and data of reference information. The loading section 506 confirms based on the notification from the information processing section 504 whether or not necessary compressed data is stored in the main memory 60.

The necessary compressed data here includes not only compressed data necessary for next display but also compressed data estimated to be required later. The latter data is data representative of, where the angle of view is fixed, a same display region and a region of a predetermined range around the same display region from within a frame later on the time axis. On the other hand, where the angle of view varies as a result of movement of the point of view or the like, the above-mentioned latter data is data representative of a display region of the destination of the movement predicted from the variation of the angle of view and a region of a predetermined range around the display region from within a later frame. If necessary data is not stored in the main memory 60, then the loading section 506 loads the compressed data from the hard disk drive 50 and stores the compressed data into the main memory 60. It is to be noted that data including needed compressed data may be acquired directly from a server (not depicted) connected through a network. In this case, the needed compressed data is stored directly into the main memory 60 depending upon a decision of one of the loading section 506 and the server.

The display image processing section 508 includes a data specification portion 510, a decoding portion 512, and a rendering portion 514. The data specification portion 510 refers to reference information loaded in the main memory 60 based on frame coordinates conveyed thereto from the information processing section 504 to specify compressed data suitable for display of a next display region. The information to be specified here is the position, in an integrated image, of pixels included in frame coordinates. The decoding portion 512 reads out and decodes compressed data of the needed portion from the main memory 60 based on the position information designated from the data specification portion 510.

The rendering portion 514 carries out a process for re-construction for returning the decoded data to the original position based on the reference information to render a display image in the frame memory of the display processing part 44. This process may be a process of rendering a display image configured from regions represented by frame coordinates or may be a rendering process including a mapping process of video textures. It is to be noted that some or all of the functions of the control part 100b may be provided in a server (not depicted) connected to an image processing apparatus operated by a user. At this time, the rendering portion 514 of the server may transmit the data of the rendered display image to the image processing apparatus operated by the user through a network such that the display image according to an input of the user is displayed on the display apparatus 12.

Figure 12:
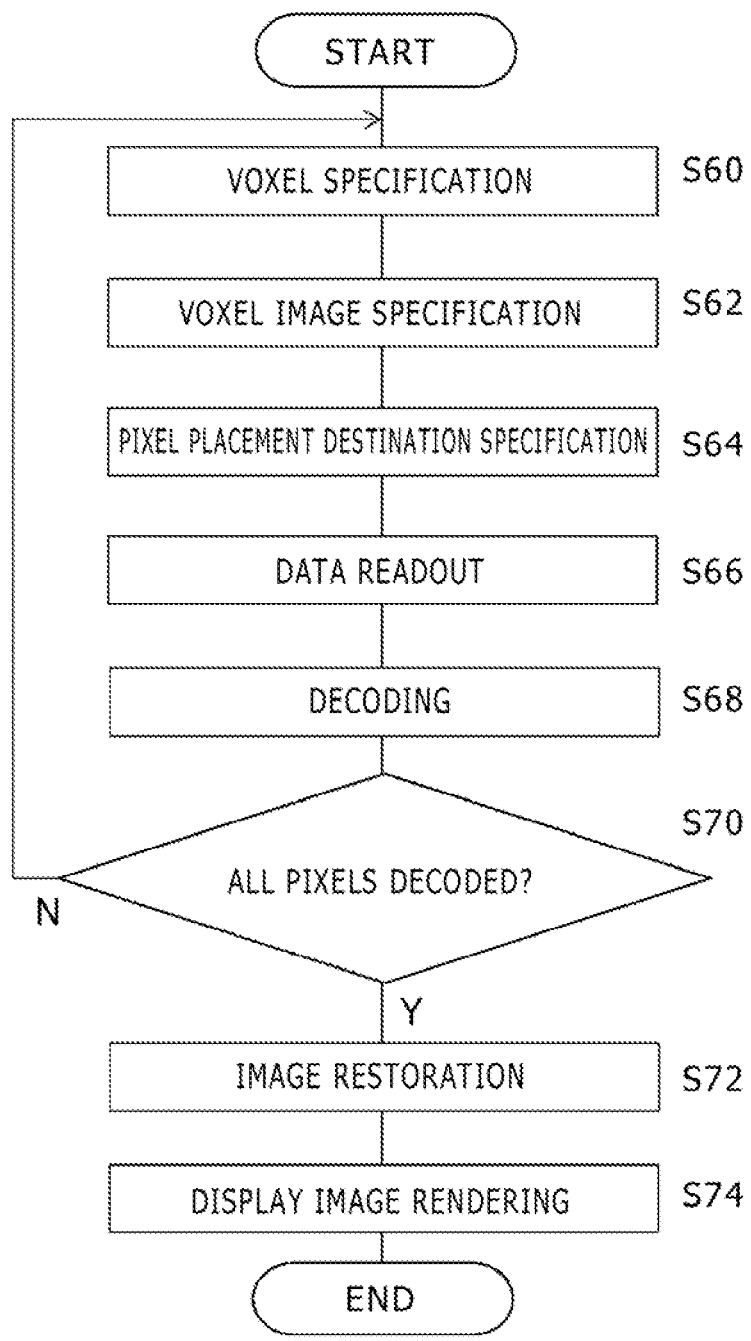
FIG. 12 is a flow chart illustrating a procedure of a display image generation process carried out by a display image processing section in the present embodiment.

FIG. 12 is a flow chart illustrating a procedure of the display image generation process carried out by the display image processing section 508. First, the data specification portion 510 specifies a voxel including needed data from the frame number and the frame coordinates conveyed thereto (S60). Then, the data specification portion 510 refers to index information in reference information corresponding to the voxel to specify the position of corresponding voxel information in the corresponding integrated image (S62). It is to be noted that the reference information is obtained as pixel values of the voxel corresponding to a two-dimensional array.

Then, the data specification portion 510 refers to the grouping pattern information in the reference information to specify a placement destination of the pixels suitable for display in the voxel image (S64). The decoding portion 512 reads out the pixel data at the specified position in a unit of quantization from the compressed integrated image and decodes the pixel data (S66, S68). This process is repeated until all pixels in the region indicated by the frame coordinates are decoded (N at S70). If all pixels are decoded (Y at S70), then the rendering portion 514 first restores images of 8×8 pixels of the voxel based on the reference information, connects the images in a unit of voxel data and then connects the images in a unit of a tile image to restore the original image (S72).

When the image of the voxel is to be restored, the grouped pixels in the voxel image are returned to the original positions, and the voxel image is divided for each frame. Thereafter, the images represented by the average values are used as they are or are interpolated depending upon the redundancy to restore voxel data for 8×8 pixels×4 frames. Then, the voxel data are affixed or the like to an image rendered in accordance with some other information processing of a game or the like to render a final display image (S74). The processes at S66 and S68 carried out by the decoding portion 512 as described above can be implemented using general hardware for decoding compressed data by S3TC or the like.

Now, a technique for compressing a frame of an original moving picture separately for a reference image and a difference image is described. FIG. 13 particularly depicts a configuration of the control part 100c and the hard disk drive 50 in the image processing apparatus 10 which has a function compressing moving picture data separately for a reference image and a difference image. The control part 100c includes a tile image sequence generation section 320, a reference image compression section 322, a difference image generation section 324, a difference image compression section 326, and a compressed data generation section 328. The tile image sequence generation section 320 generates a tile image sequence from moving picture data of a target of compression. The reference image compression section 322 compresses reference images obtained by reducing the tile image sequence. The difference image generation section 324 generates difference images based on the reference images. The difference image compression section 326 compresses the difference images. The compressed data generation section 328 associates the compressed data of the reference images and the compressed data of the difference images with each other to generate final compressed data.

A moving picture data storage section 330, a grouping pattern storage section 332, and a compressed data storage section 334 included in the hard disk drive 50 have similar roles to those of the moving picture data storage section 130, grouping pattern storage section 132, and compressed data storage section 134 of FIG. 3, respectively. Also the tile image sequence generation section 320 generates a tile image sequence in a similar manner to that by the tile image sequence generation section 120 of FIG. 3.

The reference image compression section 322 includes the functions of the image compression section 122 of FIG. 3. However, upon compression, the reference image compression section 322 reduces the tile image sequence generated by the tile image sequence generation section 320 at a predetermined ratio in the space direction to generate reference images. The difference image generation section 324 decodes data of frames of the tile image sequence generated by the tile image sequence generation section 120 and data of the reference images compressed by the reference image compression section 322 to determine differences from the restored corresponding frames for each corresponding pixel to generate a difference image sequence corresponding to the tile image sequence.

The difference image compression section 326 includes the functions of the image compression section 122 of FIG. 3 and compresses the difference image sequence generated by the difference image generation section 324. However, since the difference images are restrictive in regard to the range of the pixel value, the different image sequence is compressed such that this characteristic is reflected as an advantage on the data size or the efficiency of the rendering process. In particular, the pixel value of all of voxels which are configured from only pixel values lower than a predetermined threshold value is regarded as 0.

The compressed data generation section 328 puts together the integrated image compressed by the reference image compression section 322 and the integrated image compressed by the difference image compression section 326 to form a single compressed image and puts together individual reference information and then associates the single compressed image and the reference image with each other. This is carried out for each tile image sequence, and resulting compressed images and reference information are further associated with positions or frame numbers of the original tile images to obtain compressed data of the moving picture. The compressed data of the moving picture are stored into the compressed data storage section 334.

Figure 14:
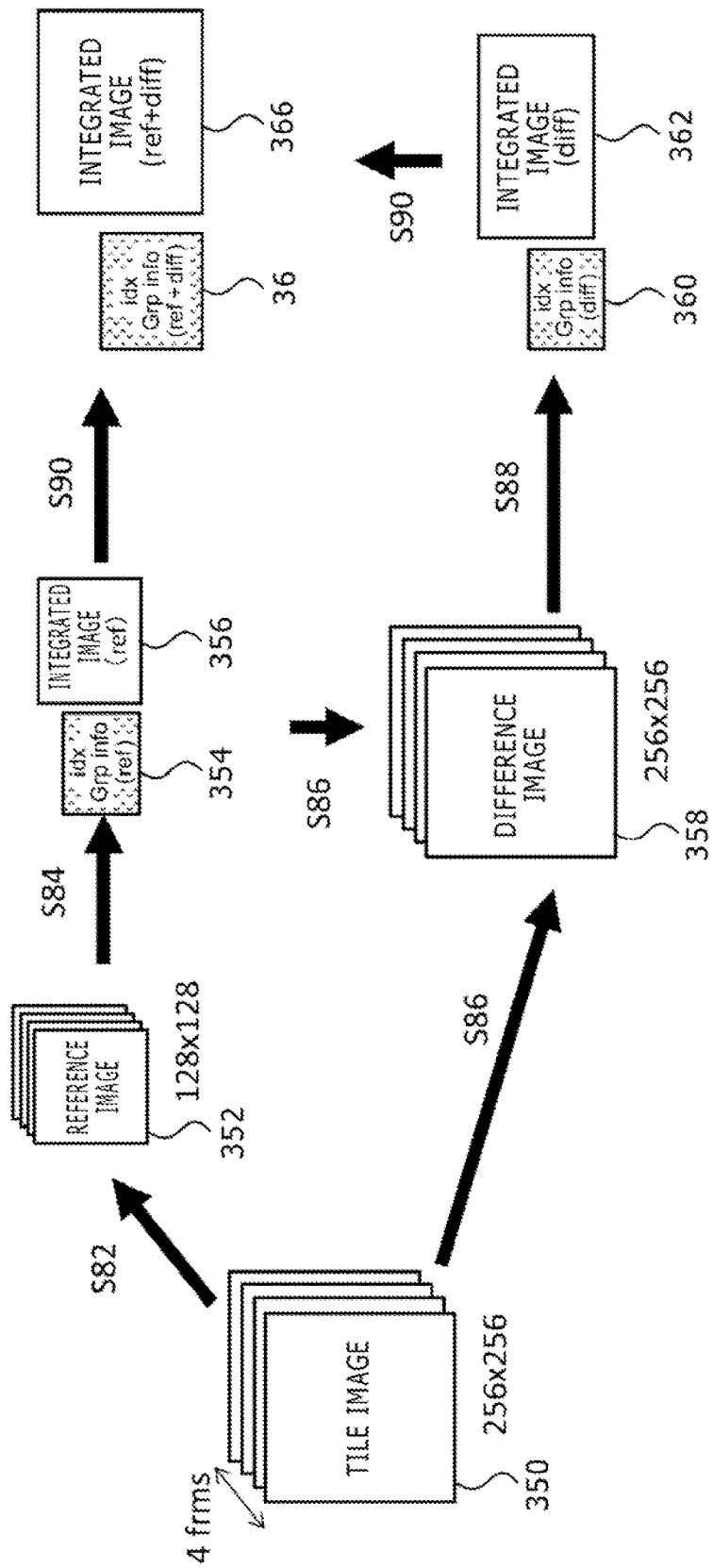
FIG. 14 is a view schematically illustrating a compression procedure of moving picture data carried out by the image processing apparatus having the function of separating moving picture data into and compressing a reference image and a difference image in the present embodiment.

FIG. 14 schematically illustrates a compression procedure of moving picture data carried out by the image processing apparatus 10 including the control part 100c. First, a frame sequence of moving picture data read out from the moving picture data storage section 330 is divided into tile image sequence 350 by the tile image sequence generation section 320. Here, the tile image has a size of 256×256 pixels, and the succeeding compression process is carried out for every four frames of tile images. Similarly as in FIG. 4, the pixel number of the tile images, the frame number of a processing unit, and the unit of processing carried out at the succeeding stages can be varied in various manners.

Then, the reference image compression section 322 reduces the frames of the tile image sequence to one half time in the vertical and horizontal directions to generate a reference image sequence 352 of 128×128 pixels (S82). Further, the reference image compression section 322 carries out a compression process similarly to that by the image compression section 122 of FIG. 3 to generate reference information 354 and a compressed integrated image 356 (S84).

Meanwhile, the difference image generation section 324 decodes the compressed integrated image 356 of the reference images similarly as upon image display and then re-constructs the integrated image 356 based on the reference information 354 and thereafter enlarges the reconstructed integrated image to twice in the vertical and horizontal directions thereby to restore an image of 256×256 pixels. Then, the difference image generation section 324 calculates the difference between the restored image of 256×256 pixels and the corresponding frame of the tile image sequence 350 of 256×256 pixels generated by the tile image sequence generation section 320 to generate a difference image sequence 358 of 256×256 pixels (S86).

Then, the difference image compression section 326 carries out a compression process similar to that by the image compression section 122 of FIG. 3 to generate reference information 360 and a compressed integrated image 362 (S88). Then, the compressed data generation section 328 puts together the compressed integrated image of the reference images and the compressed integrated image of the difference images to generate a single integrated image 366. Further, the compressed data generation section 328 puts together also the reference information 354 of the reference images and the reference information 360 of the difference images to generate a single piece of reference information 364 (S90). This sequence of processes is repeated for all of the other tile image sequences for four frames. Further, this process is repeated for every four ones of succeeding frames to compress the entire moving picture data.

Since a difference image is an image representative of errors arising from compression of a reference image, it has a characteristic that the pixel values become low in comparison with general images. If an image having such low pixel values is compressed, then since the ratio of one gradation with respect to the pixel value becomes high, the influence of the compression error is likely to become remarkable. Therefore, the difference image compression section 326 temporarily raises the pixel values to suppress the influence of an error before the compression of an integrated image. In particular, the difference image compression section 326 carries out compression after it multiplies, by a numerical value selected in a unit of a voxel, all of the pixel values of pixels included in the voxel.

For example, eight different numerical values of 1, 2, 4, 8, 16, 32, 64, and 128 are prepared, and one of the values with which the compression error is smallest is selected. For example, for each voxel, pixel values are multiplied by the numerical values and then decoded, whereafter the decoded pixel values are multiplied by reciprocal numbers to the multiplied values to restore the image. Then, one of the values with which the difference from the original difference image is smallest is selected. The identification number of the multiplication value selected in this manner is recorded as the gain information 306 in the reference information 300 illustrated in FIG. 10.

Further, the difference image compression section 326 confirms whether or not all of the pixel values included in the voxel image are equal to or lower than a predetermined threshold value. If all of the pixel values are equal to or lower than the threshold value, then the pixel values of the pixels are assumed to be equal to 0, and the data of the voxel are determined as data of a NULL type which is a special type. A voxel whose data are of the NULL type is processed, in a decoding process upon image display, as a voxel in which all pixel data are 0. In this case, if it is recorded that the voxel is of the NULL type, then it is not necessary to place the actual data on an integrated image. Therefore, as the identification number of the grouping pattern of the reference information, "15" is newly applied to the voxel of the NULL type. If it is found that the grouping pattern is "15" upon display, then all of the pixel values of the voxel are regarded as 0. Accordingly, the other data in the reference information of such a voxel as just described are invalidated.

Figure 15:
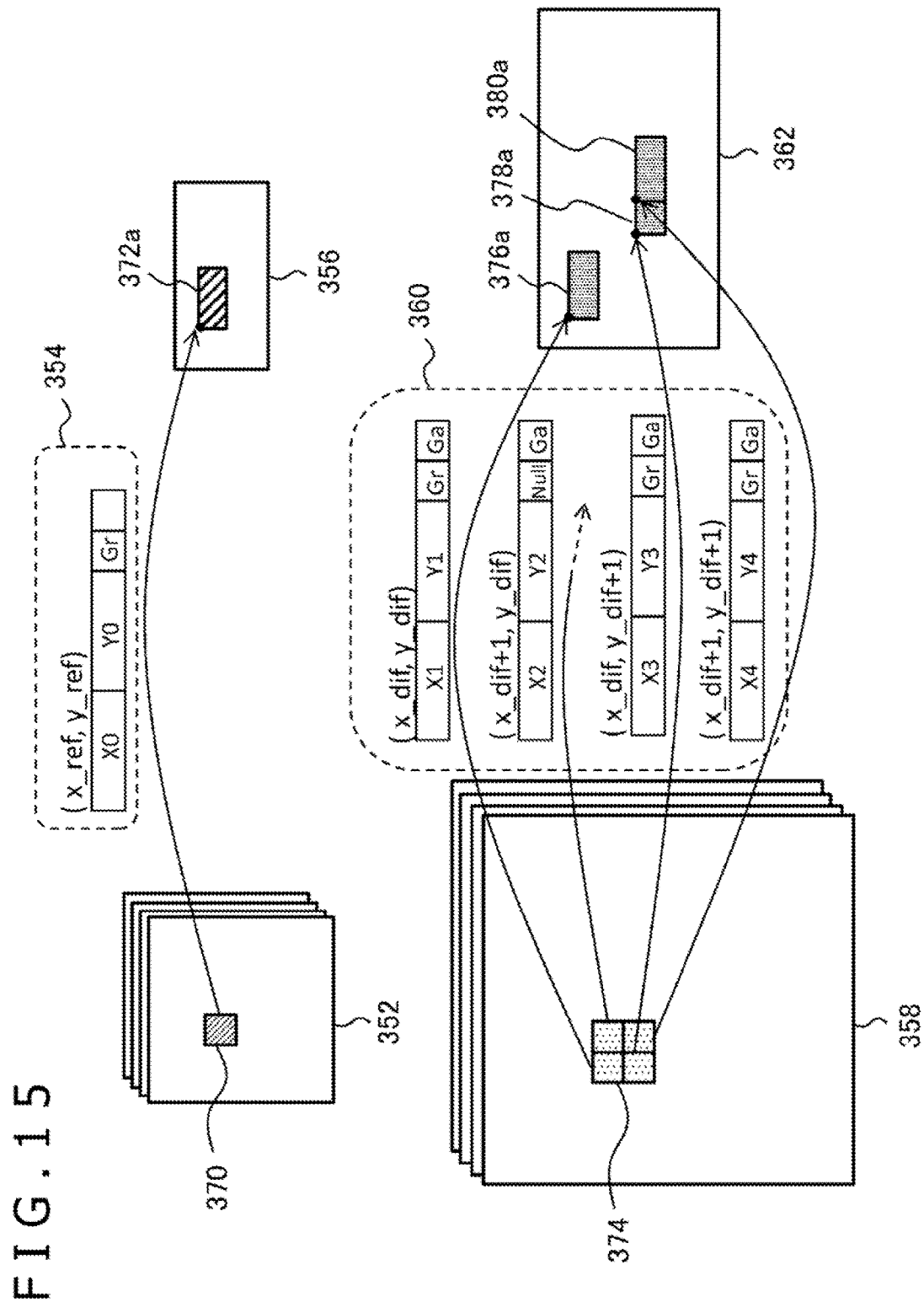
FIG. 15 is a view illustrating a relationship between reference information of a reference image and a compressed integrated image and between reference information of a difference image and a compressed integrated image in the present embodiment.

FIG. 15 is a view illustrating a relationship between the reference information 354 of the reference image and the compressed integrated image 356 generated at S84 of FIG. 14 and between the reference information 360 of the difference image and the compressed integrated image 362 generated at S88. It is to be noted that data readout from the integrated image after compression is carried out by designating coordinates before compression, and therefore, also in the following description, coordinates indicated by index information are those of an integrated image before compression.

First, it is assumed that data of a certain voxel 370 in the reference image sequence 352 is placed into a region 372a of an integrated image 356 through a reduction process and deployment on a two-dimensional plane. At this time, the coordinates (X0, Y0) of the left upper corner of the region 372a as index information and grouping pattern information (Gr) as reference information 354 are recorded in an associated relationship with the position (x_ref, y_ref) on a two-dimensional array of the voxel 370 in the reference image sequence 352.

The reference image sequence 352 is the image obtained by reducing the original tile image to one half time in the vertical and horizontal directions. Accordingly, in the difference image sequence 358, a region 374 corresponding to the voxel 370 of the reference image sequence 352 is configured from four voxels including two voxels in each of the vertical and horizontal directions. It is assumed that the data of the voxels are placed in regions 376a, 378a, and 380a in the integrated image 362. At this time, index information, grouping pattern information, and gain information are recorded as the reference information 360 in an associated relationship with the positions (x_dif, y_dif), (x_dif+1, y_dif), (x_dif, y_dif+1), and (x_dif+1, y_dif+1) on the two-dimensional array of the four voxels in the original difference image sequence 358.

In FIG. 15, a value representative of the NULL type, for example, "15" is recorded as the grouping pattern information of the voxel at the position (x_dif+1, y_dif), and therefore, the entity of the data corresponding to the voxels is not included in the integrated image 362. Accordingly, the coordinates (X1, Y1) of the left upper corner of the region 376a associated with the position (x_dif, y_dif), the coordinates (X3, Y3) of the left upper corner of the region 378a associated with the position (x_dif, y_dif+1), and the coordinates (X4, Y4) of the left upper corer of the region 380a associated with the position (x_dif+1, y_dif+1) are valid index information.

Figure 16:
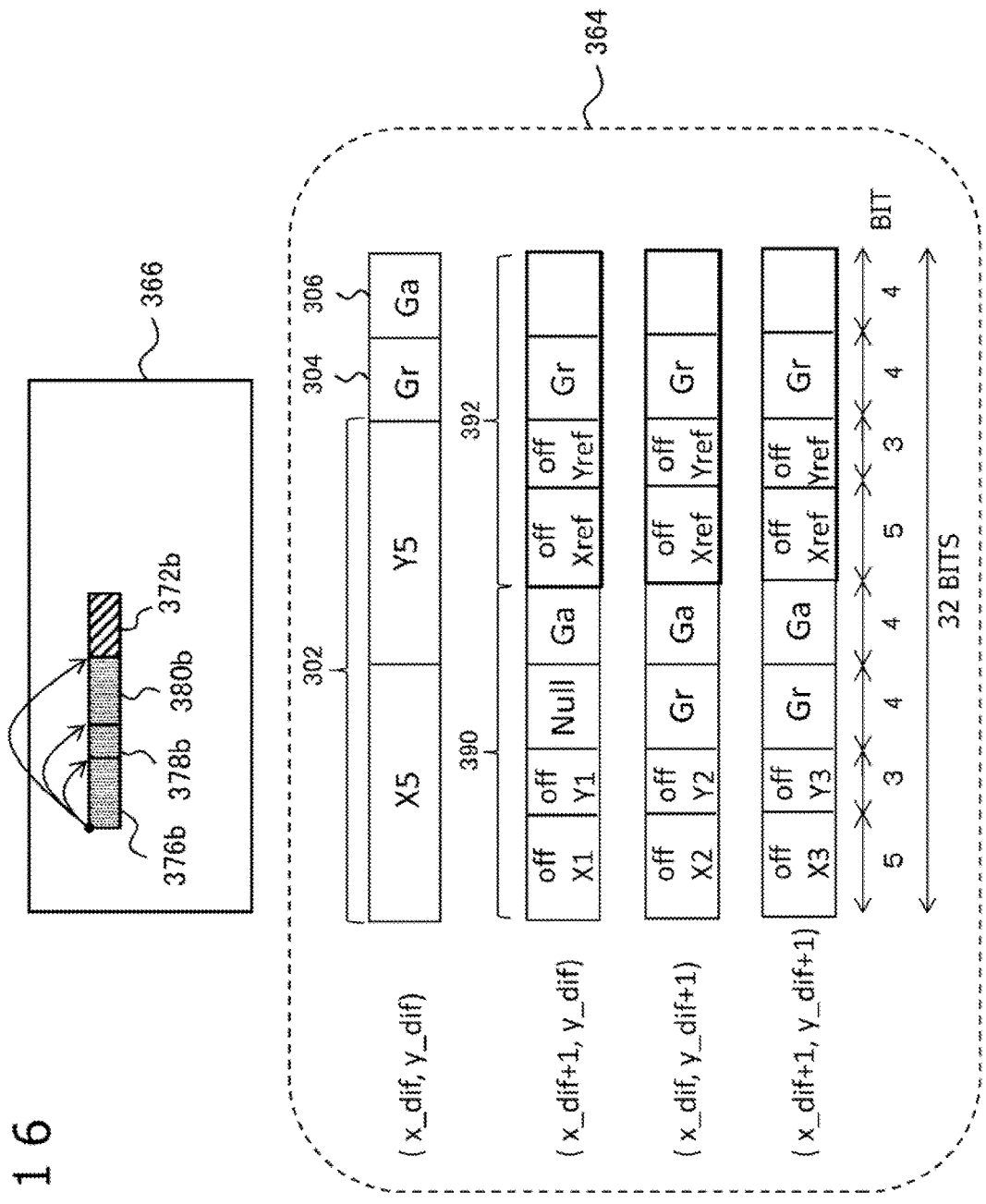
FIG. 16 is a view illustrating a process of integrating data of a reference image and data of a difference image to produce reference information and a compressed integrated image one by one.

FIG. 16 is a view illustrating a process for integrating data of reference images and data of difference images to generate a piece of reference information 364 and one compressed integrated image 366. The integrated image 366 in which the reference images and the difference images are put together is configured such that storage units each including [four voxel data of the difference images] and [one voxel data of the corresponding reference images] except voxels of the NULL type are lined up in a raster order on an image plane of a predetermined size. Accordingly, in FIG. 15, three voxel images placed in the regions 376a, 378a, and 380a in the integrated image 362 of the difference images and one voxel image placed in the region 372a in the integrated image 356 are placed in regions 376b, 378b, 380b, and 372b, which connect to each other, in the integrated image 366 after the integration, respectively.

Where the storage units are put together in this manner, if only the position of the first voxel image of a difference image is demonstrated, then the positions of the other voxel images can be represented by offset values from the position of the first voxel image. Therefore, in the reference information 364 after the integration, the coordinates (X5, Y5) of the left upper corner of the region 376b, grouping pattern information 304, and gain information 306 are recorded first in a normally manner in an associated relationship with the position (x_dif, y_dif) of the voxel at the left upper corner of the difference image. Then, as regards the other voxels, offset values from the coordinates (X5, Y5) except those of the NULL type are recorded as index information.

As depicted in FIG. 6, each voxel image has a width of eight pixels in the vertical direction and a value of a multiple of eight pixels in the horizontal direction. Accordingly, the coordinates at the left upper corner of a voxel image normally have values of multiples of eight. Therefore, the magnifications are recorded as offset values. Consequently, the size of a data region suitable for index information can be compressed. This is utilized to embed reference information of a reference image into reference information of 32 bits originally associated with the remaining three voxels in the difference image.

To this end, in the reference information 364 of FIG. 16, reference information corresponding to each of the positions (x_dif+1, y_dif), (x_dif, y_dif+1), and (x_dif+1, y_dif+1) of the three voxels is structured such that, to the own reference information 396, reference information 392 of the corresponding voxel of the reference image is connected. Here, (off X1, off Y1), (off X2, off Y2), and (off X3, off Y3) are offset values of the voxels of the difference image. However, in the case of FIG. 16, (off X1, off Y1) is invalid because the voxel is of the NULL type. (off Xref, off Yref) is an offset value of the voxels of the reference image.

It is to be noted that, in the reference information 392 of the reference image, the same information is recorded with regard to the three voxels of the difference image. Consequently, for whichever voxel of the difference image an image is required, the position of needed pixels of the reference image and the difference image can be specified by a readout process of the reference information carried out two times in the maximum including the reference information for the first voxel from among the four voxels belonging to the storage unit. If the offset value in the X direction is configured from 5 bits and the offset value in the Y direction is configured from 3 bits as illustrated in FIG. 16, then the reference information can be configured within 32 bits irrespective of the data structure. Accordingly, similarly as in the case in which a reference image and a difference image are not separated, the data structure of an RGBA image can be utilized as it is to treat reference information as an image.

It is to be noted that, although five voxel images in the maximum belonging to one storage unit are stored basically into one horizontal row, they may be divisionally stored in a plurality of rows by designating a position in the vertical direction utilizing an offset value in the vertical direction from within the reference information. Further, if the right end of the integrated image is reached midway of one voxel image, then the remaining part of the voxel image is placed in the immediately lower row. Such a rule is set in advance that, upon display, if this is found based on the index information and the grouping pattern information, then reading out only of the remaining part is carried out by adding 1 to the offset value in the vertical direction.

Image display using the data compressed by the mode described above can be implemented similarly to the procedure illustrated in FIG. 12 basically using an image processing apparatus which includes the control part 100b of FIG. 11. However, at S66, voxel images of a reference image and a difference image are read out in set. Further, after voxel data are decoded at S68, pixel values of a difference image are restored by multiplying the pixel values by a reciprocal number to the value multiplied upon compression based on gain information. In voxel data of the NULL type, all pixel values are determined to be 0. Further, when an image is restored at S72, the placement of the decoded pixels is returned to the original placement first, and then the reference image is expanded to two times in the vertical direction and the horizontal direction. Then, the difference image is added to generate the original image.

Although the number of moving picture data determined as a processing target in the foregoing description is one frame at each point of time, an image at each point of time may otherwise be configured from a plurality of frame sequences represented in different resolutions. If the frame sequence to be used is changed over in accordance with a viewpoint moving request from the user, the variation range of the resolution can be expanded significantly while a moving picture is applied. At this time, a plurality of frame sequences of different resolutions are hierarchized in a resolution order to establish a hierarchical structure. Moving picture data having such a hierarchical structure as just described are hereinafter referred to as "hierarchical data."

Figure 17:
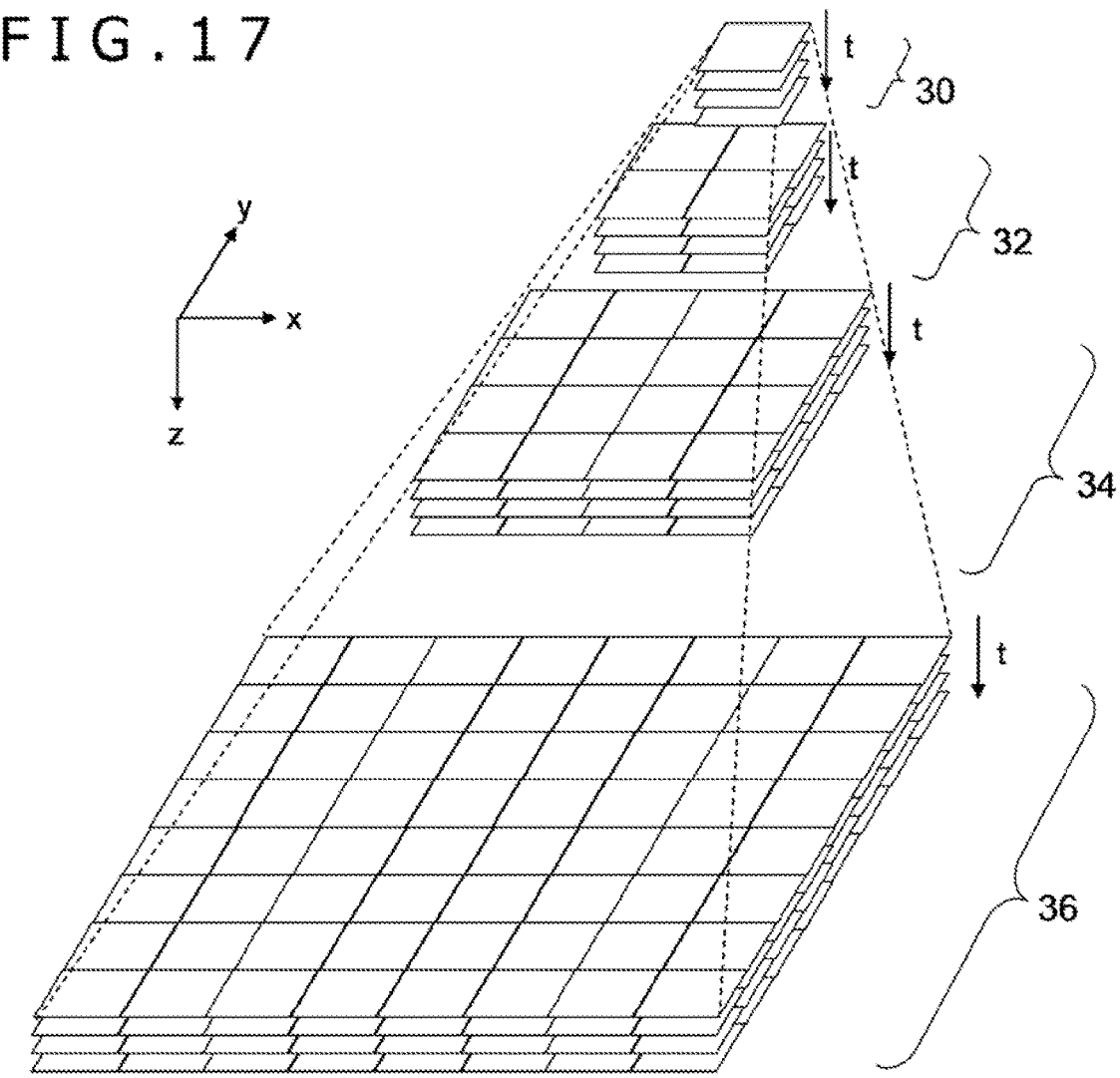
FIG. 17 is a view conceptually illustrating a data structure where a moving picture is configured from hierarchical data in the present embodiment.

FIG. 17 conceptually illustrates a data structure where a moving picture is represented by hierarchical data. The hierarchical data have a hierarchical structure configured from a 0th hierarchy 30, a first hierarchy 32, a second hierarchy 34, and a third hierarchy 36 in a z direction from the top to the bottom in FIG. 17. It is to be noted that, although only four hierarchies are depicted in FIG. 17, the number of hierarchies is not limited to this. As described hereinabove, each hierarchy is configured from a frame sequence in which frames in which one moving picture is represented by different resolutions are arranged in a chronological order. In FIG. 17, each hierarchy is represented symbolically by four frames. However, the number of frames naturally differs depending upon the reproduction time or the frame rate of the moving picture.

The hierarchical data have a hierarchical structure, for example, of a quad tree, and it is assumed that the 0th hierarchy 30 includes one tile image; the first hierarchy 32 includes 2×2 tile images; the second hierarchy 34 includes 4×4 tile images; and the third hierarchy includes 8×8 tile images. At this time, the resolution of the Nth hierarchy (N is an integer equal to or greater than 0) is one half that of the (N+1)th hierarchy in both of the leftward and rightward (x-axis) direction and the upward and downward (y-axis) direction on the image plane. The hierarchical data can be generated by reducing each frame to a plurality of stages based on the moving picture of the third hierarchy 36 having the highest resolution or by a like process.

Viewpoint coordinates upon moving picture display and a corresponding display region can be represented by a virtual three-dimensional space configured from the x axis representative of the leftward and rightward direction of the image, the y axis representative of the upward and downward direction, and the z axis representative of the resolution as depicted in FIG. 17. It is to be noted that, since each hierarchy is configured from frame sequences individually representative of moving pictures, an image displayed actually relies also upon the time after the display is started, and in FIG. 17, a time axis t is represented for each hierarchy.

Basically, the image processing apparatus 10 sequentially renders frame sequences of one of the hierarchies along the time axis t at a predetermined frame rate. For example, a moving picture of the resolution of the 0th hierarchy 30 is displayed as a reference image. If, in the course of the display, a display region moving requesting signal is supplied from the inputting apparatus 20, then the image processing apparatus 10 derives a change amount of the display image from the signal and derives coordinates (frame coordinates) of the four corners of a next frame in the virtual space using the change amount. The image processing apparatus 10 then renders an image frame corresponding to the frame coordinates. Along with this, a changeover boundary for a hierarchy is provided for the z axis so that the hierarchy of moving picture data to be used for frame rendering is changed over suitably in response to the z value of the frame coordinates.

For example, when the resolution required for a display image is between a changeover boundary between the first hierarchy 32 and the second hierarchy 34 and a changeover boundary between the second hierarchy 34 and the third hierarchy 36, the display region is rendered making use of the image data of the second hierarchy 34. At a resolution between the changeover boundary between the first hierarchy 32 and the second hierarchy 34 and the second hierarchy 34, the image frame of the second hierarchy 34 is displayed in a reduced scale. At a resolution between the changeover boundary between the second hierarchy 34 and the third hierarchy 36 and the second hierarchy 34, the image frame of the second hierarchy 34 is displayed in an expanded scale.

Hierarchical data are compressed in a unit of a tile image sequence into compressed data similarly as described hereinabove. It is to be noted that, in this case, the compressed data of a tile image sequence is associated not only with a position on the image plane but also with a position in the resolution direction.

When such hierarchical data as described above are used to accept a moving request for a display region of a moving picture being displayed including expansion or reduction, if the data compression technology of the present embodiment is applied, then only compressed data of a necessary tile image may be loaded and only a necessary region may be decoded. Therefore, in comparison with an alternative case in which an entire image is loaded or decoded, the waste is reduced in the cost for the loading process and the decoding process, the transfer cost, and the memory cost. For example, when data of the third hierarchy 36 are used to carry out image display, since the display region is given using only a small portion of the data, the cost saving effect is particularly high. As a result, the processing can be progressed typically at an equal cost without depending upon the resolution for the display and smooth moving picture display can be achieved.

Further, when the hierarchy is to be changed over in accordance with a viewpoint moving request during display of a moving picture using hierarchical data, data for a next point of time needs to be acquired instantly with regard to a hierarchy after the changeover which has not been a decoding target till then. Since the compressed data in the present embodiment are independent of each other for every predetermined number of frames such as every four frames, they are superior also in random accessibility in the time direction and such hierarchy changeover can be carried out seamlessly.

Where a moving picture is configured from such hierarchical data, also it is possible to use an image of a certain hierarchy as a reference image and form images of the lower hierarchies only as difference images. In other words, an image of a higher hierarchy is expanded and added to generate a display image of a resolution of a lower hierarchy. For example, if the third hierarchy 36 is formed as difference images and an image of the second hierarchy 34 is utilized as a reference image, then the data size decreases significantly. In this case, the difference images are configured such that gain information is included in the reference information or data of the NULL type is introduced as described hereinabove. On the other hand, integration of compressed data of the reference image/difference image is not carried out, and therefore, the second hierarchy 34 can be decoded independently. By including the hierarchy of a reference image suitable for display of a difference image in reference information, an image also in a hierarchy other than the immediately higher hierarchy can be used as a reference image.

Further, data of a certain hierarchy may be formed as compressed data in which a reference image and a difference image are integrated as described hereinabove. In this case, since the reference image included in the compressed data is same as the image in the immediately higher hierarchy, when the resolution of the immediately higher hierarchy is to be displayed, part of the integrated data can be used as such by extracting the same. As the hierarchy which holds a difference image becomes lower, and as such hierarchies increase, the compression ratio of data can be raised. Since the picture quality and the data compression ratio have a tradeoff relationship to each other, a hierarchy in which a difference image is to be included and whether or not a reference image and a difference image are to be integrated are determined in accordance with the balance between the picture quality and the compression ratio required for the image processing apparatus. A mipmap may be implemented by a similar configuration.

With the present embodiment described above, a compression process is carried out in a unit of a voxel obtained by dividing a tile image sequence, which is obtained by dividing frames which configure a moving picture into a predetermined size, further in the time direction and the space direction. Along with this, voxel images obtained by deploying frames in the time direction belonging to the voxel on a two-dimensional plane are connected to generate one integrated image for each tile image and then compressed. By determining an image as a compression target in this manner, a conventional image compression technology can be utilized. By utilizing decoding hardware, for example, of S3TC, time and data of an image region suitable for display can be read out and decoded readily.

As a result, random access in the space direction and the time direction can be implemented readily at a low cost. Further, since only partial data can be determined as a decoding target, the cost for a loading process and a decoding process is reduced, and besides, since the necessity to deploy an image on a memory is eliminated, also the memory cost is reduced.

In conventional moving picture compression technologies, when an image where a moving picture is mapped as a video texture is displayed, decoding of a moving picture which is not displayed needed to be continued in preparation for next display even if the texture region is very small or is displaced out of the angle of view by an operation of the user or the progress of the game. In the present embodiment, since only data corresponding to an actual display area may be processed, the processing efficiency can be improved significantly. Accordingly, the present embodiment is particularly effective where it is desired to synthesize a moving picture as a background of a game or a video such as an advertising sign of a stadium, a display, the sky, or a remote landscape.

Further, voxel images which configure an integrated image which makes a compression target are reduced in the space direction and the time direction as far as possible taking the redundancy into consideration. Further, the nature that similar image regions exist in one voxel image is utilized such that pixels are grouped in such patterns that pixels having pixel values close to each other are put together and re-placed into one region to reduce a quantization error. By such processes, the compression ratio can be improved and degradation of an image can be suppressed in accordance with an actual image. Further, reference information of pixels suitable for display for determining a position on an integrated image is recorded for each voxel.

By configuring the reference information from 32 bits or the like, the reference information itself can be held by a data structure of the image.

Further, compressed data may be formed by compressing each tile image sequence separately for reference images obtained by reducing the tile image sequence and difference images representative of the differences between images obtained by decoding the compressed data of the reference images and the original tile images, integrating the compressed reference images and difference images and compressing the integrated images. In this case, voxel images representative of the same region in two or more images are connected to each other in set. Further, reference information of reference images of the same set is embedded into a data region for reference information of the difference images. Consequently, it becomes possible to generate a display image by a reduced number of times of reading out, and a moving picture which is high in compression ratio and little in degradation of the picture quality can be implemented.

The present invention has been described in connection with the embodiment thereof. The embodiment described above is exemplary, and it can be recognized by those skilled in the art that various modifications are possible to the combinations of the components and the processing procedures of the embodiment and that such modifications remain within the scope of the present invention.

For example, not only a moving picture, but also such image sequences that have a redundancy therebetween may be determined as a compression target. For example, in data (Light Field data) picked up using a camera array, a redundancy can be expected between picked up images by adjacent cameras. Therefore, for a moving picture in which a plurality of picked up images are placed on the time axis, efficient compression can be anticipated. Further, also application to a technology (View Dependent Texture) for changing the texture image to be displayed depending upon the angle of view is possible. In particular, images which may possibly be displayed are compressed as a moving picture in which they are placed on the time axis, and upon rendering, an arbitrary image is randomly accessed and displayed.

REFERENCE SIGNS LIST

10 Image processing apparatus, 12 Display apparatus, 20 Inputting apparatus, 44 Display processing part, 50 Hard disk drive, 60 Main memory, 100 Control part, 120 Tile image sequence generation section, 122 Image compression section, 128 Compressed data generation section, 130 Moving picture data storage section, 132 Grouping pattern storage section, 134 Compressed data storage section, 140 Processing unit formation portion, 142 Reduction portion, 144 Plane deployment portion, 146 Re-placement portion, 148 Compression portion, 502 Input information acquisition section, 504 Information processing section, 506 Loading section, 508 Display image processing section, 510 Data specification portion, 512 Decoding portion, 514 Rendering portion, 320 Tile image sequence generation section, 322 Reference image compression section, 334 Difference image generation section, 326 Difference image compression section, 328 Compressed data generation section.

INDUSTRIAL APPLICABILITY

As described above, the present invention can be utilized for information processing apparatus such as computers, information terminals, image processing apparatus, image display apparatus, and game machines.

The invention claimed is:

1. An image processing apparatus, comprising:
an information processing section configured to calculate frame coordinates of a frame sequence, which configures moving picture data, and a region within the frame sequence to be displayed;
a loading section configured to read in a compressed integrated image, where the compressed integrated image is produced by: (i) a tile image sequence generation section dividing the frame sequence in a space direction which configures an image plane to generate a tile image sequence; (ii) an image compression section dividing the tile image sequence in the space direction and a time direction to form a plurality of voxels of a predetermined size; (iii) the image compression section deploying image sequences in the time direction included in each one voxel on a two-dimensional plane to form a voxel image; (iv) the image compression section connecting the voxel images to form an integrated image; and (v) the image compression section compressing the integrated image;
a decoding portion configured to: (i) decompress the compressed integrated image to produce the integrated image; (ii) read out the voxel images from the integrated image; and (iii) recovering the tile image sequence from the voxel images based on further information; and
a rendering portion configured to re-construct the region from the frame sequence in the time and space directions to render a display image.

2. The image processing apparatus according to claim 1, wherein:
the further information includes reference information which associates positions in the frame sequence which configure the moving picture data and positions of voxel images in the integrated image;
the image processing apparatus further comprises a data specification portion configured to refer to the reference information based on information calculated by the information processing section to specify the position of a needed voxel image from within the integrated image; and
the decoding portion reads out data of the needed voxel image in accordance with the information specified by the data specification portion.

3. The image processing apparatus according to claim 1, wherein
the compressed integrated image is further obtained by integrating the voxel images for a reference image sequence obtained by reducing the frame sequence in a space direction and voxel images for a difference image sequence configured from difference images representative of differences between images obtained by decoding the compressed data of the integrated image for the reference image sequence and original frame images; and
the rendering portion renders a display image by adding data of the decoded reference images and data of the difference images for each corresponding pixel.

4. The image processing apparatus of claim 1, further comprising
a compressed data generation section configured to output the compressed integrated image in an associated relationship with a position on a moving picture frame and a position on the frame sequence of original tile images.

5. The image processing apparatus according to claim 4, wherein the image compression section further selects, from among a plurality of grouping patterns prepared in advance for grouping the voxels to form groups of pixels, a pattern which exhibits a smallest error when the formed groups of the pixels are individually put together into one region and compressed for each voxel, and carries out re-placement of the pixels in each voxel image in accordance with the selected pattern.

6. The image processing apparatus according to claim 4, wherein,
before the image compression section deploys the image sequences on the two-dimensional plane, when an error arising from reduction of the images included in any voxel in one of the space direction and the time direction is equal to or smaller than a threshold value, the image compression section reduces the images included in the voxel in the reduction direction and by a magnification at the time; and
when the integrated image is generated, the image compression section generates also index information which associates the position of the voxel in the tile image sequence and the position of the voxel image in the integrated image with each other.

7. The image processing apparatus according to claim 4, wherein the image compression section determines placement of the image sequences on the two-dimensional plane such that the voxel images have a unified magnitude in the vertical direction.

8. The image processing apparatus according to claim 4, wherein:
the image compression section compresses the tile image sequence reduced in the space direction as a reference image sequence;
the image processing apparatus further comprises a difference image generation section configured to generate a difference image sequence configured from difference images representative of differences between tile images which configure the tile image sequence and images obtained by decoding the compressed reference image sequence and individually corresponding to the tile images;
the image compression section further generating and compressing the integrated image corresponding to the difference image sequence;
the compressed data generation section further integrating the integrated images corresponding to the reference image sequence representative of same tile images and the integrated images corresponding to the difference image sequence to obtain compressed data of a single integrated image.

9. The image processing apparatus according to claim 4, wherein
the compressed data generation section places, when the integrated images of the reference image sequence and the difference image sequence are integrated, voxel images of each one voxel of the reference images and a corresponding voxel of the difference images as a storage unit into successive regions, and outputs index information which associates the positions of the voxels in the reference image sequence and the difference image sequence and the positions of the voxel images in the integrated image with each other in an associated relationship with the compressed data of the integrated image; and
in the index information, the positions of the voxel images other than the voxel at the top belonging to one storage unit are represented by offset values from position coordinates of the top voxel image.

10. The image processing apparatus according to claim 8, wherein the image compression section multiplies, when the integrated image corresponding to the difference image sequence is to be generated, all of the pixels which configure the voxel image by a multiple selected for each of the voxels to generate gain information which associates the voxel and the magnification used in the multiplication.

11. The image processing apparatus according to claim 4, wherein the image compression section considers that, when all of the pixels of a voxel have pixel values equal to or lower than a predetermined threshold value, all of the pixel values of the voxel are zero and does not include the voxel image into the integrated image.

12. An image processing method by an image processing apparatus generating a display image using compressed data of a moving picture, comprising:
calculating frame coordinates of a frame sequence, which configures moving picture data, and a region within the frame sequence to be displayed;
reading in a compressed integrated image, where the compressed integrated image is produced by: (i) dividing the frame sequence in a space direction which configures an image plane to generate a tile image sequence; (ii) dividing the tile image sequence in the space direction and a time direction to form a plurality of voxels of a predetermined size; (iii) deploying image sequences in the time direction included in each one voxel on a two-dimensional plane to form a voxel image; (iv) connecting the voxel images to form an integrated image; and (v) compressing the integrated image;
decompressing the compressed integrated image to produce the integrated image;
reading out the voxel images from the integrated image;
recovering the tile image sequence from the voxel images based on further information; and
re-constructing the region from the frame sequence in the time and space directions to render a display image.

13. The image processing method of claim 12, further comprising
outputting the compressed integrated image in an associated relationship with a position on a moving picture frame and a position on the frame sequence of original tile images to a storage apparatus.

14. A non-transitory, computer-readable recording medium in or on which a computer program is recorded, the computer program for causing a computer to carry out actions, comprising:
calculating frame coordinates of a frame sequence, which configures moving picture data, and a region within the frame sequence to be displayed;
reading in a compressed integrated image, where the compressed integrated image is produced by: (i) dividing the frame sequence in a space direction which configures an image plane to generate a tile image sequence; (ii) dividing the tile image sequence in the space direction and a time direction to form a plurality of voxels of a predetermined size; (iii) deploying image sequences in the time direction included in each one voxel on a two-dimensional plane to form a voxel image; (iv) connecting the voxel images to form an integrated image; and (v) compressing the integrated image;
decompressing the compressed integrated image to produce the integrated image;

reading out the voxel images from the integrated image;
recovering the tile image sequence from the voxel images based on further information; and
re-constructing the region from the frame sequence in the time and space directions to render a display image.

15. The non-transitory, computer-readable recording medium of claim 14, further comprising
outputting the compressed integrated image in an associated relationship with a position on a moving picture frame and a position on the frame sequence of original tile images to a storage apparatus.

* * * * *